United States Patent [19]
Laskowski

[11] Patent Number: 5,798,923
[45] Date of Patent: Aug. 25, 1998

[54] OPTIMAL PROJECTION DESIGN AND ANALYSIS

[75] Inventor: Peter Laskowski, Madison, Ala.

[73] Assignee: Intergraph Corporation, Huntsville, Ala.

[21] Appl. No.: 544,812

[22] Filed: Oct. 18, 1995

[51] Int. Cl.$^6$ ...................................................... G06F 19/00
[52] U.S. Cl. ...................... 364/420; 345/117; 345/418; 345/427; 364/400; 382/276; 382/293; 382/298
[58] Field of Search ..................... 345/117, 418, 345/427; 364/400, 420, 571.01, 571.08, 715.03, 715.04; 382/276, 277, 285, 293, 295, 298; 395/118, 127

[56] References Cited

U.S. PATENT DOCUMENTS

| | | | |
|---|---|---|---|
| 3,145,474 | 8/1964 | Taylor, Jr. .............................. | 395/127 |
| 3,634,951 | 1/1972 | Knoll ...................................... | 434/152 |
| 4,695,964 | 9/1987 | Seto et al. .............................. | 395/127 |
| 5,546,572 | 8/1996 | Seto et al. .............................. | 395/605 |

OTHER PUBLICATIONS

"Minimum–Error Projection for Global Visualization", Laskowski, Piotr, in GIS/LIS '91 Procedings, Amer. Cong. on Surveying and Mapping, Bethesda, MD, Oct.–Nov. 1991 vol. 1 pp. 166–169.

"New Projections for World Maps/A Quantitive–Perceptive Approach", Canters, Frank, *Cartographica*, vol. 26, Nov. 2 (1989), pp. 53–71.

"An Ideal Map Projection for Global GIS Output", Laskowski, Piotr, International Society for Photogrammetry and Remote Sensing, (1992), pp. 754–756.

"Flattening the Globe", *Ohio State Quest*, Spring 1989, p. 13, Gelchion, Robert.

"Choosing a World Map–Attributes, Distortions, Classes, Aspects", American Congress on Surveying and Mapping, Falls Church, Virginia (1988), pp. 1–15.

"Which Map Is Best? Projections for World Maps", American Congress on Surveying and Mapping, Falls Church, Virginia (1986), pp. 1–14.

"Matching the Map Projection to the Need", American Congress on Surveying and Mapping, Bethesda, Maryland (1991), pp. 1–30.

*Primary Examiner*—Edward R. Cosimano
*Attorney, Agent, or Firm*—Bromberg & Sunstein LLP

[57] ABSTRACT

A system for deriving a cartographic projection having minimum distortion with respect to selected elements of distortion. A first function contains modifiable parameters for mapping earth coordinates into two-dimensional coordinates on the surface of a map, the parameters being varied in such a way as to minimize a function containing a selected set of distortion components normalized according to a predetermined set of relative weights. The selected distortion components may include distortion with respect to distance, angle, and area.

22 Claims, 13 Drawing Sheets

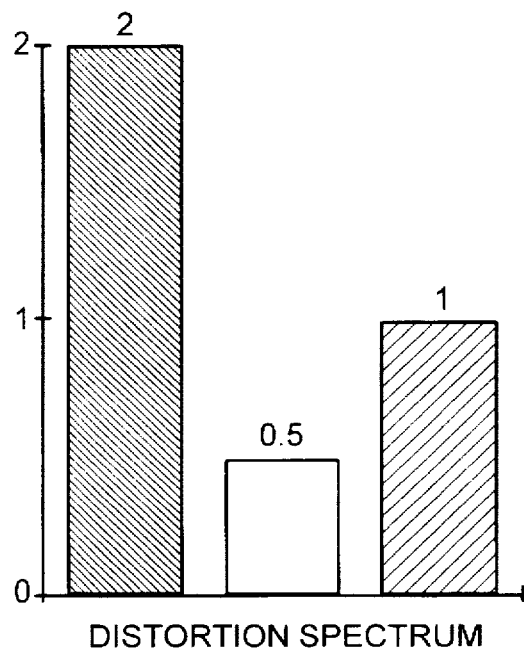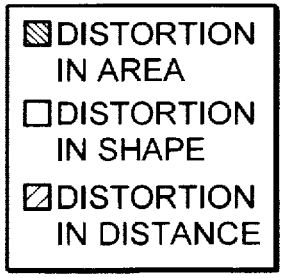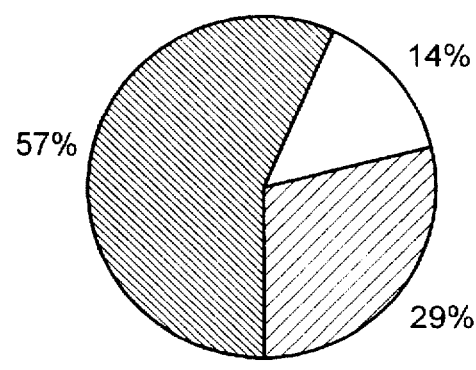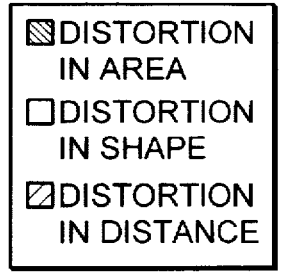
FIG. 7A                    FIG. 7B 5,798,923

OPTIMAL PROJECTION DESIGN AND ANALYSIS

TECHNICAL FIELD

The present invention relates to map making and more particularly to software systems for evaluating and designing cartographic projections and maps from such projections.

BACKGROUND ART

Basic terminology.

The projection in cartography is any transformation of the globe on to a flat plane of a map. The mathematical formulas describing the projection transformation are called the mapping equations. Due to the geometric incompatibility of the globe and the plane, every projection (and therefore every map) contains cartographic distortions. The four most important kinds of distortions (also referred here as the distortion components) are: distortion in distance, distortion in area, distortion in shape, and a mixed distortion in area & shape. The mathematical formula or the computational procedure used to evaluate quantitatively the amount of distortion (of any kind) is generally called the distortion measure. The distortion component is a specific distortion measure, such as the measure of distortion in distance or area, (as well as its specific numerical value) evaluated in the process of measurement of this particular kind of distortion in the projection of interest, called the subject projection. The distortion component is not normalized until it has been normalized against the chosen standard projection called the reference projection (different from the subject projection).

Cartographic projection design.

The design of projections for cartographic purposes is an ancient art. All projections have distortions of some kind, so cartographers devised various measures to measure distortions in projections.

Early investigations by Lambert, Lagrange, and Gauss were devoted to the local measures of distortions, best described by the theory of Tissot's Indicatrix (first published in 1881). Local measures of distortion embrace three kinds of cartographic distortions: distortion in area, distortion in shape, and a mixed distortion in area & shape. Local measures give the correct value of distortion only for small patches on the surface of the earth no bigger than a few kilometers across. Any attempt to apply these measures to larger regions on the earth results in only an approximation of the real value of distortion for that region.

More recently the finite measures of distortions (referring to regions of arbitrarily large extent, from few km to few thousand km across) were introduced to cartography, pioneered by Milnor (1969), Gilbert (1974), and Tobler (1977), and applied to the world maps by Peters (1984), Canters (1989), and Laskowski (1991). Finite measures of distortions are based on the analysis of distortion of the finite length distances on the earth which may extend hundreds of kilometers in length and more. A network of thousands of such distances, placed randomly within the entire region on the map, is most often used to derive a single measure of distortion representative of finite distance distortion of the entire region.

At first, local measures of distortion were studied separately from finite measures of distortion, until Laskowski (1991) proposed a combination measure of distortions in maps. In his method, both kinds of distortions, local and finite, are evaluated and minimized together to produce a minimum-error projection, named the Tri-optimal Projection.

Any projection that is constructed by considering a combination of various kinds of distortions is called in cartography the compromise projection. In the past, the process of constructing a compromise projection (maintaining a balance among all kinds of distortions) was only qualitative in nature, and could be considered as much an "art" as an exact science. It was based on the subjective artistic insight of a designer through a tedious trial-and-error manual procedure. The best example of such work is Robinson's projection. The use of Laskowski's prior art distortion minimization technique just quantified the design tasks, such that the minimum-error projection could be found "automatically" by a computer. However, it did not convert the projection design into an exact science either. The intuitive element of "art" is still as prominent in Laskowski's procedure as it was for Robinson—neighter technique provides any clue or strategy how the relative composition of various kinds of distortions in the resultant compromise projection can be quantitatively controlled and used effectively for the design of minimum-error projections with the predictable distortion characteristics.

SUMMARY OF THE INVENTION

The present invention offers the means to create better minimum-error projections (sometimes called compromise projections) in an efficient and quantitative (rather than qualitative) manner. The present invention utilizes a new concept in analytic cartography—the normalization of distortions. In the past, the different kinds of distortions in a subject projection could never be compared with each other because they are expressed in different "natural units". However, as provided in the present invention, the distortion components can be normalized (calibrated) against a reference projection to form what will be called here the distortion spectrum of the subject projection. The distortion spectrum is the new term proposed here to denote a set of normalized distortion components of a given projection. The distortion function is the new term proposed here to denote a linear combination (such as the weighted average) or the (weighted) Root Mean Square (RMS) of two or more selected normalized distortion components contained in the distortion spectrum. The minimum-error projection in cartography is the projection which has the minimum amount of distortions (usually measured by the selected distortion component or by the Distortion Function), as compared with all conceivable projections in a specified class of all possible projections. The compromise projection in cartography is a projection constructed to maintain a balance among two or more distortion components.

The term distortion spectrum is proposed to denote a set of normalized distortion components in the subject projection. Distortion spectrum characterizes the amounts and the relative proportions of various cartographic distortions in any projection, and can be used as a new cartographic analysis tool for evaluating, classifying, and comparing map projections. The normalized distortion components in the distortion spectrum of a projection are all expressed in a single "Standard Unit of Distortion" (to be called here SUD for short), and therefore can be inter-compared. Underpinning the present invention is a procedure for normalizing distortions that enables new kinds of cartographic designs and analyses that were not possible before.

The present invention provides the means to normalize the distortion components and to construct the distortion spectrum for the subject projection, and then applies the new ability of inter-comparing distortions (provided by the distortion spectrum) to two important areas of cartography: the evaluation and analysis of distortions in the existing projections, and the design of new projections (belonging to the class of minimum-error projections). The projection which has the minimum amount of distortions, as compared with all conceivable projections in the specified class of projections, is called in cartography the minimum-error projection. In the first application for evaluation and analysis of distortions, a very useful information about the nature of a projection is provided through the distortion spectrum. In the second application, for the design of new projections, the mathematical technique of optimization is employed to minimize the distortion function, which is defined as the prescribed combination of distortion components in the distortion spectrum of a projection having adjustable parameters (such projection will be called the trial projection). Since the normalized distortion components are used in distortion minimization process, by the appropriate choice of coefficients in the combination describing the distortion function the user can control the relative composition of distortions in the resultant minimum-error projection.

In a first embodiment, the invention provides a system for evaluating quantitatively the degree of distortion in a given cartographic projection, called here the subject projection. The system of this embodiment includes a parameter storage means for storing parameters of mapping equations describing the subject projection, separate parameter storage means for storing parameters of mapping equations describing the reference projection, and a distortion evaluation means for calculating the numerical values of distortion components of the subject projection, as well as the reference projection according to the user-specified design criteria. The design criteria means allow to specify the detailed directives how to measure distortions. These directives are saved in the storage means for the design criteria. The design criteria directives include the user-selection of the specific mathematical formula describing each distortion component, out of many possibilities maintained in the storage of formulas for distortion components. The system also includes the normalization weights storage means for storing the normalization weights, one weight for each distortion component. Finally, the system includes the distortion normalization means for calculating the normalization weights (which are thereafter stored in the weights storage means) and for using these weights as multiplicative factors to normalize the numerical values of the selected components of distortion of the subject projection (determined by the distortion evaluation means). The normalization weights are calculated by first evaluating the selected components of distortion in the reference projection. The weights are then determined as those multiplicative factors which bring the numerical values of the distortion components in the reference projection to the levels indicative of the relative contribution of each component believed to exist in the reference projection. After the weights have been established, they are used (as multiplicative factors) to calculate the normalized distortion components (collectively called the distortion spectrum) of the subject projection.

In a further embodiment, the invention provides a software system for deriving new cartographic projections having minimum distortion among all projections satisfying given design criteria. Such projections are called in cartography the minimum-error projections. This system includes all the software modules described above for the previous system (some with extended capabilities), as well as some new software modules. The parameters of the mapping equations describing the subject projection are, in this embodiment, modifiable. Each particular instance of these parameters determines what is called a trial projection. This embodiment further includes the distortion function minimization means for modifying at least one of the parameters of the current trial projection (stored in the parameter storage means for trial projections), in such a way as to reduce the value of the distortion function. If such a modification is possible, this new set of parameters establishes a new trial projection, with the lower value of distortion function. The distortion function combines together the normalized values of the selected distortion components (such as in a form of weighted sum) and is indicative of the overall distortion performance of the trial projection, as well as any other subject projection. The distortion function minimization means also determine whether the value of the distortion function for the current trial projection has been minimized to a sufficient extent, so that this latest trial projection can be regarded as the sought for minimum-error projection.

In a preferred embodiment, the distortion function can be a linear combination (weighted sum), or the weighted Root Mean Square (RMS) of the normalized values of the selected distortion components; the mapping equations of each trial projection can be polynomials with the modifiable parameters being the polynomial coefficients, or the mapping equations can be the specific mathematical expressions defining a projection in a specific class (such as the conic class), with the modifiable parameters being specific to that chosen class (such as the two standard parallels for the conic class). Also in a preferred embodiment, the system uses the given initial projection to be the first trial projection from which the distortion minimization process begins. The reference projection, which is required by the distortion normalization means, can be provided as a separate projection, or the given initial projection can play the role of the reference projection.

The new types of visualizations and interactive multimedia analyses of cartographic distortions, including the graphic representations for the distortion spectrum and the distortion dial, representation of distance distortion field, and what will be called the "sonification" of distortions with the associated cartographic analyses (including the "stethoscopic examination" of a projection) are also included in the invention.

BRIEF DESCRIPTION OF THE DRAWINGS

The invention will be more readily understood by reference to the following brief and detailed descriptions, taken with the accompanying drawings, in which:

FIGS. 7A and 7B illustrate two kinds of visualizations of the distortion spectrum: as a bar graph (called here "distortion bars" or simply "distortion spectrum"), and as a pie chart (called here "distortion dial") respectively for a projection analyzed in accordance with a preferred embodiment of the invention;

INTRODUCTION

In a first embodiment, the present invention provides a system for the evaluation and analysis of the amount of distortion in a given projection (called the subject projection), including the evaluation of the relative composition of different kinds of distortions in a subject projection (evaluation of the distortion spectrum). The distortion spectrum is produced with the help of a computational procedure for normalization of distortions. In a second embodiment, the present invention provides a system for the design of minimum-error projections, having the least amount of distortions among all projection satisfying given set of design criteria, and having a desired relative composition of different kinds of distortions. The control of the relative composition of distortions is achieved by adjusting the coefficients of the distortion function evaluated based on the distortion spectrum of a projection.

These embodiments have been implemented in software written in C, running on Intergraph's "Interpro 6750" computers (based on "C400 Clipper" chip), using the Unix operating system, and are described in further detail below.

Figure 1:
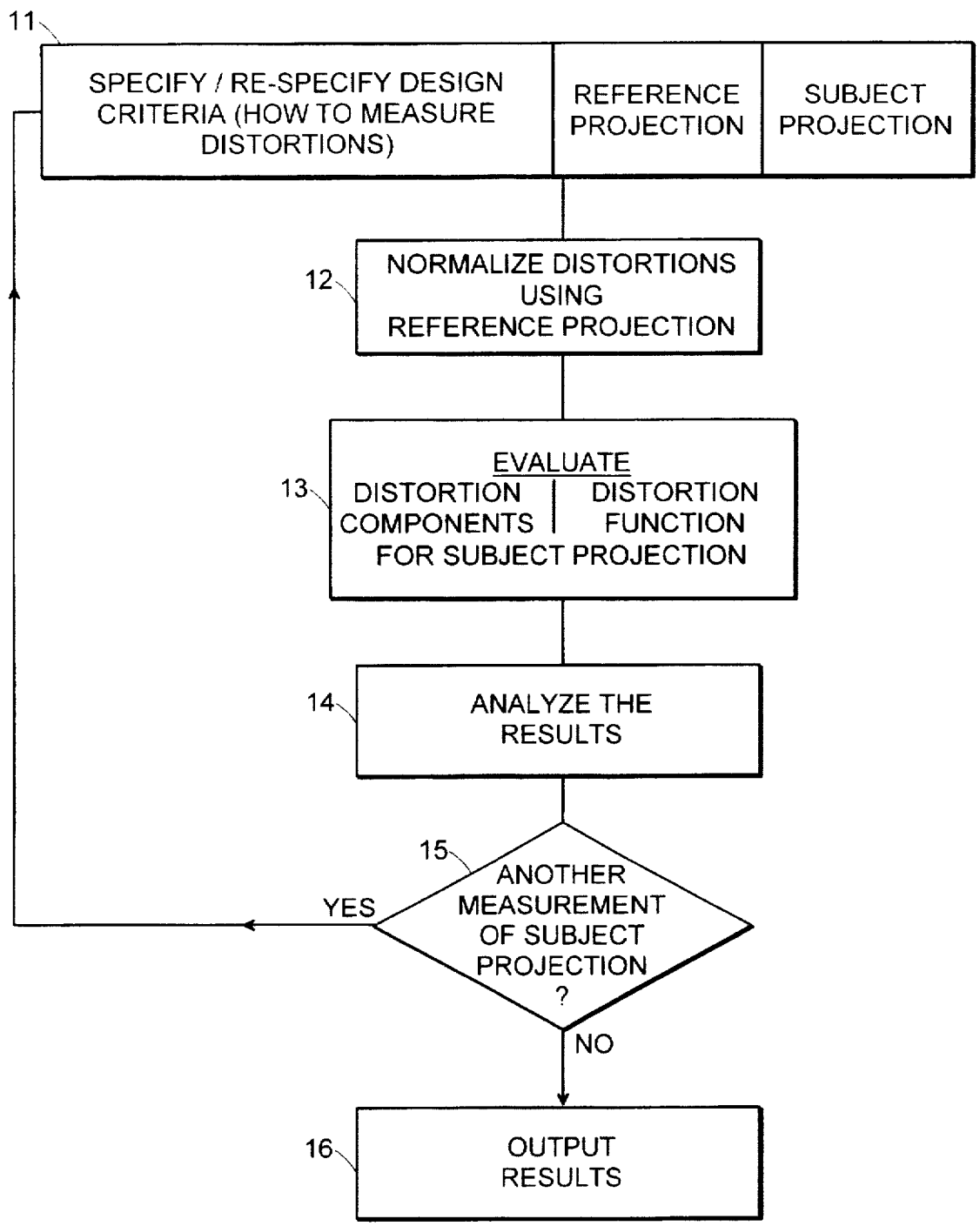
FIG. 1 is a logical flow diagram of a preferred embodiment of the invention used to provide a system for evaluating quantitatively the degree of distortion in a subject projection (using the reference projection as a distortion measurement standard)

FIG. 1 is a brief logical flow diagram of a preferred embodiment of the invention used to provide a system for evaluating quantitatively the degree of distortion in a subject projection, including the normalization of distortions, and evaluation of the relative composition of different kinds of distortions. FIG. 1 shows the main conceptual stages in user work flow—each stage being comprised of one or more software modules to be described later in connection with FIG. 3.

The top row (block 11) in FIG. 1 summarizes the inputs to the system. The input is provided for user-specified design criteria (directives how to measure distortions), for the user-selected reference projection (used to normalize distortions), and for the user-identified subject projection (the projection of interest to be cartographically analyzed), during the interactive computer session with the design criteria module. Also during the input stage, the user can define (among other things) the mathematical form and the geometric properties of the distortion measures (mathematical formulas describing various distortion components), and decides on the form (and coefficients) of the distortion function.

The next stage in this work flow (block 12) is the normalization of distortions against the reference projection. The distortion formulas are like newly assembled measuring instruments—they must be normalized (calibrated) against some external reference (known as the measurement standard) before they can be used to measure distortions in subject projection. The reference projection serves as such an external reference in this normalization procedure. To exploit this analogy further, the distortion normalization step can be compared to calibrating of the newly assembled mechanical scale against the international standard of 1 kg—such calibration normally results in identifying the basic unit of weight measurement (1 kg) on this particular scale. Similarly, the distortion formulas representing the cartographic distortion measures are calibrated (by means of the normalization weights determined by the distortion components normalization module) in a way which identifies the "Standard Unit of Distortion", or 1 SUD, to be equal to the amount of distortion contained in the selected reference projection (which provides the cartographic measurement standard). This way, each distortion component evaluated for the subject projection will be expressed by a correct number of Standard Units of Distortion (SUD) assigned to it.

The next step (block 13) is the distortion evaluation step. Distortion formulas pre-multiplied by the correct normalization factors (the distortion normalization weights determined in block 12) are applied to the subject projection, yielding the normalized distortion components comprising the distortion spectrum of the subject projection. The distortion spectrum is unique to every projection, and is indicative of the amount of cartographic distortion contained in that projection, as well as the relative composition of various kinds of distortions in that projection. The distortion spectrum may reveal the subtle characteristics of the subject projection, such that its closeness to being a conformal projection in comparison to its closeness to being an equal-area projection. Notice that such comparative analyses of the relative magnitudes of different kinds of distortion in a projection (which can be inferred from the distortion spectrum) were not possible prior to the present invention. The main reason is that without the idea of normalization of distortions, the distortion components could not be intercompared due to the different mathematical meaning, and different "natural" units in which they conventionally appear. For example, distortions in distance are naturally expressed in [meters], and distortions in shape in [degrees], which in the past precluded any attempt for intercomparison.

In addition to the distortion spectrum, the distortion function can be also evaluated for the subject projection as part of distortion evaluation step. The distortion function, which may involve a weighted average of the normalized distortion components, or weighted root mean square measure of these components (the "RMS power" of the distortion spectrum), can be treated as the aggregate or total measure of distortion in a subject projection. In other words, the distortion function plays the role of the "total distortion score" or an indicator of the "distortion performance" of the projection, and can be used to compare the overall cartographic quality of two or more projections. In general, the higher the value of the distortion function, the more cartographic distortions are contained in the given projection.

The next stage (block 14) in the user work flow is the analysis step. The user analyzes the results of the distortion evaluations. By means of interactive computer graphics the user can examine and visualize the distortion spectrum of subject projection in a form of distortion bars (FIG. 7A) and distortion dial (FIG. 7B). Also the user can examine and visualize on computer the distortion function, and the relative composition of distortions in distance, area and shape in the subject projection. The user can analyze and visualize on computer a large variety of different kinds of distortions, which includes the multi-media analysis of the distance distortion field (FIG. 5) through the sonification of distance distortion field, and the "stethoscopic examination" of the distance distortion field. These and other related displays and distortion statistics are available in the form of both (interactive) graphic visualizations and ASCII reports.

In the last stage (which could be called a final review stage, block 15) the user decides if another (possibly different) measurement of the same subject projection is desired. He/she may then return (the upward loop on FIG. 1) to re-specify the design criteria and to start measuring distortions from the beginning. Otherwise, if satisfied with the results, he/she may save and printout the desired results for further reference (block 16).

Figure 2:
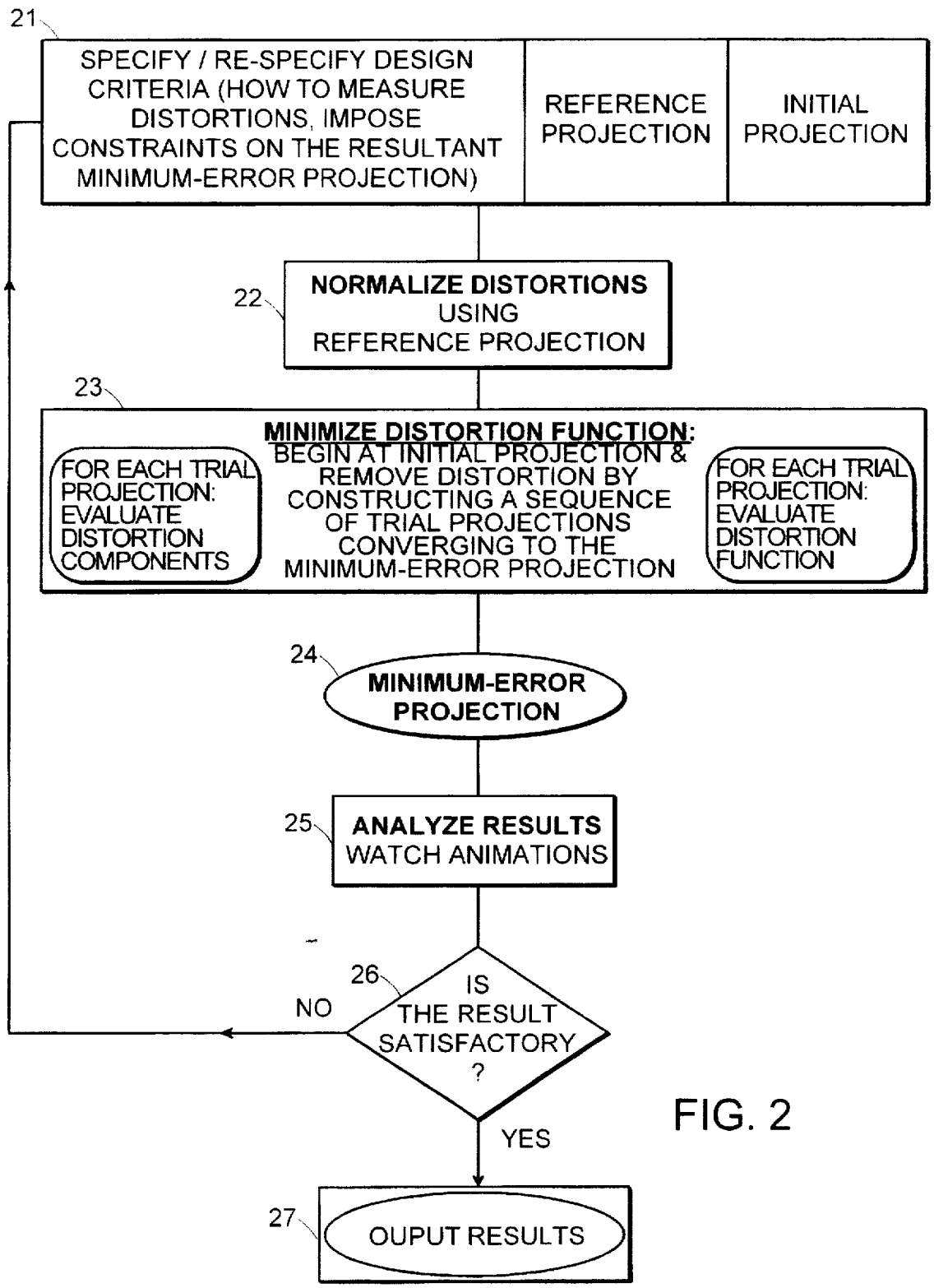
FIG. 2 is a logical flow diagram of a preferred embodiment of the invention used to design new cartographic projections with minimum-error property (having the minimum distortion among all possible projections satisfying given design criteria).

FIG. 2 is a logical flow diagram of a preferred embodiment of the invention used to design new cartographic projections which belong to a class of projections called in cartography the minimum-error projections. The top row in this figure (block 21) summarizes the inputs to the system. The inputs permit the user to specify the design criteria (which include the directives how to measure distortions, and numerical and geometric constraints describing the desired properties expected of the resultant minimum-error projection), and to select the reference projection (used to normalize distortions). Also during the input stage, the user can define (among other things) the mathematical form and the geometric properties of the distortion measures (mathematical formulas describing various distortion components), the form and the coefficients of the distortion function to be minimized, and the initial projection which is used as the first trial projection from which the distortion minimization process begins. Notice that the initial projection may be a separate projection, or the reference projection can play the role of the initial projection. The presence of the initial projection is not fundamental to the present invention. In fact, if a non-iterative algorithm for finding the minimum of the distortion function was available, then the need for the initial projection (as well as the trial projections) would have been eliminated. All this various input information is collected by the design criteria module during the interactive computer session.

The next stage in this work flow (block 22) is the normalization of the distortions against the reference projection. The purpose and the inner-working of this block is identical to that of block 12 FIG. 1 (see previous descriptions). However, the normalization plays a special role in the process of constructing of the new projections: it allows the user to specify and to control the desired relative composition of distortions in the resultant minimum-error projection (with the help of the distortion spectrum and distortion function).

The next stage (block 23) is the minimization of the distortion function. The minimization algorithm, applied to the distortion function, has the cartographic effect of reducing (removing) distortions. Beginning with the initial projection, the cartographic distortions are iteratively reduced, producing a sequence of trial projections with diminishing distortion content. By nature of the minimization algorithm (more generally called the optimization algorithm), each consecutive trial projection has lower value of the distortion function than its predecessor. Eventually, when cartographic distortions can not be reduced any further—the minimum of distortion function is reached, resulting in the minimum-error projection (symbolized by oval 24 on FIG. 2). Repeatedly, during this iterative process, the normalized distortion components are evaluated for each trial projection, and the distortion function is evaluated as the weighted average or weighted RMS of the selected distortion components.

The next conceptual stage (block 25) in the user work flow is the analysis step. The user analyzes the results of the distortion minimization, mainly by examining the geometric form and other graphic and numerical characteristics of the resultant minimum-error projection. All types of analyses and visualizations mentioned in the first embodiment—at the analysis stage 14—for the system for evaluating quantitatively the degree of distortion in a subject projection are applicable here to the resultant minimum-error projection. By means of interactive computer graphics the user can examine the distortion spectrum of the resultant minimum-error projection in a form of distortion bars and the distortion dial (FIG. 7A & B). The user can also examine the distortion function, and other related displays and distortion statistics (both in the form of graphs and ASCII reports) pertaining to minimum-error projection. The distortion function plays the role of the "total score" of the projection, so that it can be used to compare the cartographic quality of the newly constructed minimum-error projection with any previous minimum-error designs, or to any other projection. Also in the analysis stage, the animation module is used to produce and play graphical computer animations illustrating the history of development of different characteristics of the projection as it evolves (through the minimization process) over the whole set of trial projections from the initial projection, across all the intermediate trial projections, until the final minimum-error projection. A typical sample of the computer animation depicting the history of evolution of the graticule and the continental shoreline is given by FIG. 13, where the first (top) frame of the animation is the Initial Projection, the last (bottom) frame is the resultant minimum-error projection, and the middle frames represent small sample (taken one in every 100th of actual animation sequence) of all the intermediate trial projections which were generated by the distortion minimization means.

In the last stage (which could be called a final design review stage, block 26) the user decides if the resultant minimum-error projection has satisfactory characteristics. He/she may then return back (along the upward loop in FIG. 2) to re-specify the design criteria and start the minimization of distortions from the beginning (or even from any previous minimum-error result, or any intermediate trial projection, in order to improve on it further)

In case the resultant minimum-error projection is satisfactory, the user may save and print the results for future reference (block 27).

System for Analyzing Distortions in a Projection

Figure 3:
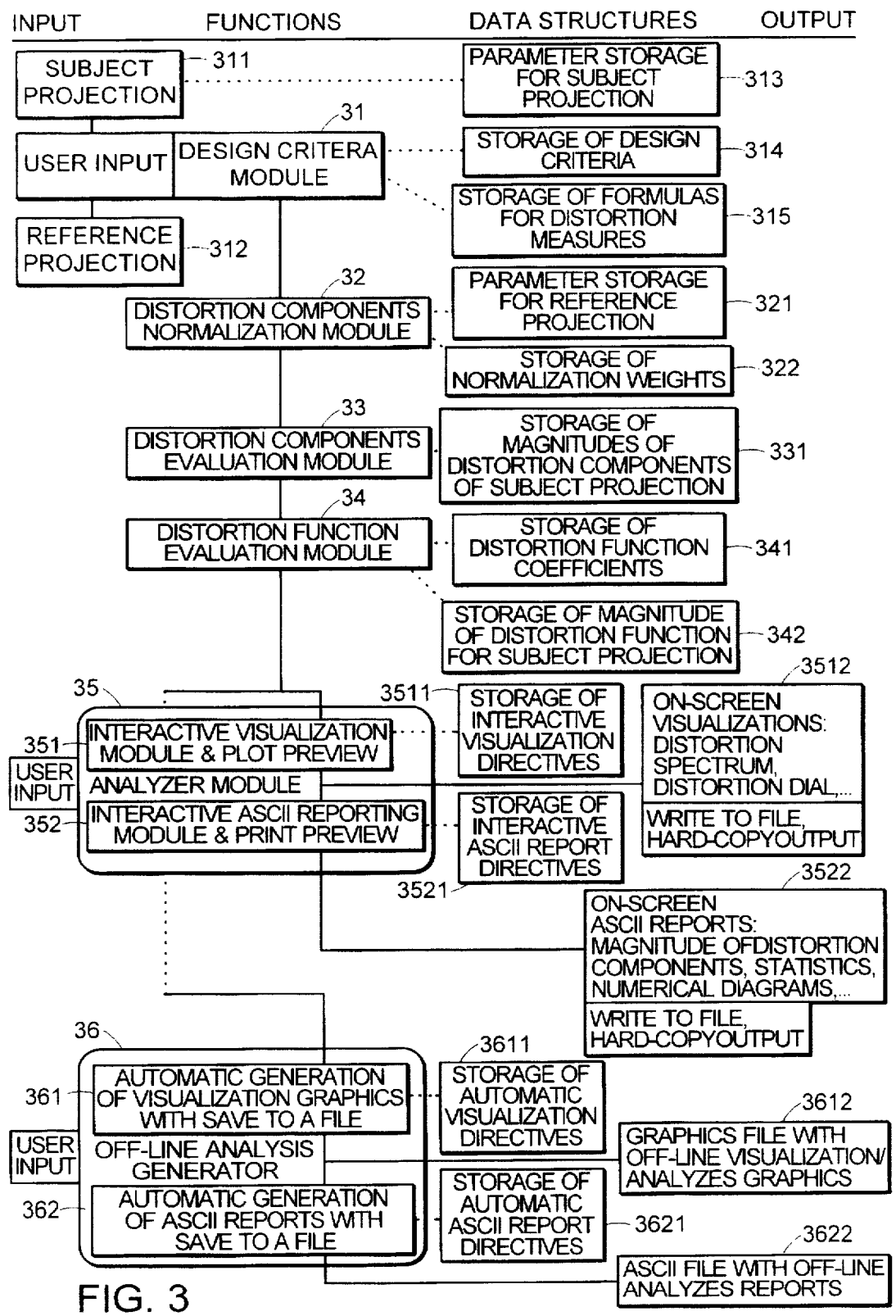
FIG. 3 is a diagram of the detailed structure of the embodiment of FIG. 1.

FIG. 3 illustrates the detailed software configuration of the system of FIG. 1 for evaluation and analyses of distortions in a given subject projection. The software components in this diagram are arranged from left to right in the following order: input (information taken from the user), functions (basic functions performed by each module), data structures (organization and storage of the basic data which support working of the basic functions and enable the exchange of information among basic modules), and output (results displayed to the user). The software components in FIG. 3 are also arranged from top to bottom to reflect the chronology of events in a typical user work flow.

Block 31 represents the design criteria module. During an interactive computer session the user enters all sorts of information describing the projection of interest (called the subject projection) (311), the reference projection, and describing specific directives how to measure cartographic distortions in the subject projection.

The user identifies the subject projection by selecting its name from the list of all projections provided by the system. After selecting the projection the user defines its specific parameters. Parameter storage for subject projection (313) is the basic data structure describing all necessary parameters characterizing the projection of interest. This structure includes parameters of the Earth's Ellipsoid (which are common to all projections), and a set of unique projection parameters (which depend on the type of projection), such as the two standard parallels in case of Lambert Conformal Conic projection. A function called the Mapping Equations accompany each such structure. The Mapping Equations, together with the projection parameters and the parameters of Earth's Ellipsoid, are invoked by different modules in the system to calculate a set of (X,Y) coordinates on the projection (called the projection coordinates) from a set of ($\lambda$, $\phi$) coordinates on the globe (called the longitude and latitude coordinates or geographic coordinates for short). This calculation is requested repeatedly and many times during the work flow. (It is the most basic calculation performed by the distortion components evaluation module (33) to be described in details further on). A good source of mapping equations for most projections used in cartography can be found in (Snyder, 1987). As a supplement to a variety of specialized data structures describing 30 or so basic projection types in common use in cartography, the unified polynomial data structure (if polynomial parameters are known) can alternatively be used to describe the subject projection. The Mapping Equations that accompany such a polynomial data structure may contain a polynomial approximation to the original, non-polynomial mapping equations, which produce equivalent numerical results, but execute on computer faster than the original Mapping Equations. The techniques of using polynomials for mapping equations are described in (Snyder, 1985) and (Canters, 1989). Also associated with the Mapping Equations and with the parameter storage for the subject projection is a function to evaluate the partial derivatives of mapping equations, called the Derivatives of Mapping Equations. The formulas for the derivatives of mapping equations (known in cartography as scale factors) for many commonly used projections can be found in (Snyder, 1987). The Derivatives of Mapping Equations are required by the distortion components evaluation module (33) to calculate the distortion components which are based on the properties of the distortion ellipse, known in cartography as Tissot's Indicatrix. The theory and the practical computational formulas related to the Tissot's Indicatrix can be found in (Laskowski, 1989), and in (Richardus et al., 1972, chapter 7).

The information describing how to measure distortions in the specified subject projection is entered next. This information is kept in the data structure called the storage of design criteria (314). This information consists of the geometric part and the algebraic part.

In the geometric part the user describes the spatial distribution of the sample points at which distortion measurements will be taken by the distortion components evaluation module (33). First, the geographic region is defined. The sample points will be placed only inside this region, which usually coincides with the entire rectangular region shown on the subject projection (which is the entire Earth's surface in case the subject projection is the world map). Irregular regions can also be specified, with boundaries which follow, for example, the outlines of the continents. To facilitate the option of selecting the irregular geographic region in the program, the access to the worldwide database of continental shoreline (such as the Digital Chart of the World) is provided. In case of the irregular region the placement of sample points and the subsequent measurement of distortions will be confined only to the specified irregular region such as to land areas only, or to oceanic areas only, depending on the user selection. Next, the type of statistical probability distribution (such as gridded, random, non-random) for collection of sample points is defined. In the most common application, in case the subject projection is the world map, the sample points are placed uniformly (random or on a grid) on the entire surface of the globe. To achieve the true spatial uniformity, the convergence of meridians towards the poles must be accounted for during that placement process. This is achieved by selecting points by random from the equivalent region projected on the flat plane of the cylindrical equal-area projection (using uniform probability distribution) and then by re-projecting points back (using inverse mapping equations of this equal-area projection) on to the corresponding longitude and latitude locations on the globe. Other non-uniform probability distributions of sample points (such as normal distribution) are also available from the design criteria module, as well as non-random distributions determined by the user (such as gridded patterns). In case the irregular region was identified, during the process of random generation of sample points according to any of the above specified statistical probability distribution, the points which fall outside the region are being simply eliminated.

Two sets of sample points are constructed: a set of pairs of points to measure distance distortions called the distance distortion field, and a set of points to measure area, shape, and mixed area-shape distortions called the sample points field.

The distance distortion field (FIG. 5) can be constructed through the following procedure. First, the beginning points of all distances are selected according to the specified statistical probability distribution. Then, for each beginning point the direction towards its end point is selected by random with uniform probability distribution (by the random drawing from 0 to 360 Degree range), and the distance to its end point along this direction is selected by random with uniform probability distribution (by the random drawing from the user-specified range of $distance_{min}$ to $distance_{max}$). In case the end point falls outside the region of interest, the distance from the beginning point to the end point can be shorten until the end point falls inside the region. The user can control the number N of the desired pairs of points in the created distance distortion field. Also, the user can visually inspect the resultant distribution of distances by viewing all the distances plotted on the subject projection which permits visualization of the distance distortion field, called the "map of distance distortion field"

(FIG. 5) The sample points field (FIG. 6) used in the process of measurement of the area, shape, and mixed area-shape distortions can be constructed through the following procedure. The set of pairs of points comprising the distance distortion field (FIG. 5) are constructed first by the procedure previously described. Then the points needed for the area, shape, or mixed area-shape distortion calculation (which comprise the sample point field) are selected as the geographic mid-points of each distance. More specifically, for each distance in the distance distortion field (defined by a specific pair of beginning and end points) the required point in the sample point field is placed at the mid-latitude and mid-longitude location determined as follows: the mid-latitude is the average of latitudes of the beginning and end points, and the mid-longitude is the weighted average of longitudes of the beginning and end points, using cosines of latitudes of the beginning and end points as the numerical weights. That way the possible spatial bias between the area (or shape) measurements and the distance measurements is prevented. The user can visually inspect the resultant distribution of points by viewing the sample points field (such as the one on FIG. 6) depicted on the subject projection or on the selected equal-area projection used solely for the purpose of displaying the sample points field. The sample points field can be displayed separately, or on top of the previously described "distance distortion field". Once created, the information on the sample points field, including points' locations, and on the distance distortion field, including distances' locations, is kept as part of the storage of design criteria (314).

In the algebraic part of the specifications defining how to measure distortions the user defines the exact mathematical formulas for the distortion measures to be used for each distortion component: of distance, area, shape, and mixed area-shape distortion type. The user can select the desired mathematical formula for each distortion component from a large set of distortion measures published in the cartographic literature, as well as the newly constructed measures having parameters modifiable by the user. The user can browse through the collection of available equations as well as through the associated graphical representations of each equation. The sources of formulas for distortion measures are scattered in the cartographic literature. The best collection can be found in (Meshcheryakov, 1965), (Biernacki, 1965), and (Canters and Decleir, 1989).

Before giving the details on the calculation of various distortions in present invention, the treatment of the nominal map scale will be explained. In measuring cartographic distortions, we are not interested in the "Xerox-copy" uniform reduction effect due to the nominal scale of a map. In the cartographic tradition as well as in the present invention this uniform reduction (which is equivalent to the similarity transformation which maintains the constant scale for all distances independently of their location, orientation, or length) is not considered cartographic distortion and is excluded from the distortion analysis. In concept, we free ourselves from the dependence on the nominal scale of the map by considering instead of the actual Earth its perfect theoretical model, called the globe, reduced to the nominal scale of a map. Any measurement of distance on the Earth actually takes place on this perfect model. Comparisons of these distances on the globe with the corresponding distances on the map lead to the distortion analysis which is independent of the nominal scale of the map. Being the Earth's perfect model in all aspects, the globe does actually involve one idealization: the irregular topography of the real Earth is disregarded and the globe is treated as the perfect ellipsoid (or as the perfect sphere depending on the application).

The methodology of measuring distances and distortion in distances will be now presented. The distances on the globe, denoted by D, will be most often measured along geodesic lines on the surface of the globe. Geodesic (or geodesic line) is defined as the shortest path between the two end points on an ellipsoid or on a sphere (on a sphere geodesic coincides with the great circle arc). The user may choose to treat the globe as a perfect ellipsoid or as a perfect sphere. Depending on his/her choice, the system will automatically apply the appropriate geodetic formulas for calculation of geodesic on the ellipsoid or on sphere respectively. The system also offers other types of distance D on the globe which are not based on geodesic (such as the normal section distance on ellipsoid, the spatial chord or line-of-sight distance in 3-dimensional Euclidean space, and others). The actual calculations of distance D on the globe are based on the standard formulas for geodesic (and other types of distances) as described in any standard geodesy textbook, such as in "Geodesy the concepts" by Vanicek et al. (1986), or "Geodesy" by Bomford (1980).

The corresponding distance on the subject projection, denoted by d, is measured along the straight line segment on the subject projection connecting the two end points, which are the projections of the two end points of the corresponding distance D on the globe.

First the user defines the distortion of any single distance by selecting an elementary mathematical expression (called the distortion indicator) which involves two distance measurements: D on the globe, and d on its corresponding image on the subject projection. The design criteria module displays several possible formulas for the distance distortion indicators (which are kept in the storage of formulas for distortion measures 315) for the user to choose from, the most common one may be the following example of distance distortion indicator:

$$e_{distance} = \frac{d}{D} - 1. \tag{1}$$

The system automatically extends this definition from a single distance to the whole distance distortion field previously constructed. The numerical contributions (values of distortion indicators) from a finite number of N distances included in the distance distortion field are summed up by the distortion components evaluation module (33). The most common form of this summation gives the so called mean-squared error measure, defined as the arithmetic mean of the squares of the indicators (1), where subscript i extends over the N distances included in the distance distortion field.

$$E_{distance} = \frac{1}{N} \sum_{1}^{N} e_{distance}^2 = \frac{1}{N} \sum_{i=1}^{N} \left( \frac{d_i}{D_i} - 1 \right)^2. \tag{2}$$

Other summation techniques, including the robust estimators, are also available, producing a variety of possible distance distortion measures.

The methodology of calculating distortions in area, shape, and mixed area-shape distortions will be now explained. Distortion in area and distortion in shape at a single point are described by elementary expressions (called areal and shape distortion indicators) which involve the parameters a and b of Tissot Indicatrix. The parameters a and b are automatically calculated by the distortion components evaluation module (33) for any point in the sample points field (FIG. 6), using the formulas published in (Laskowski, 1989) or in any standard cartography textbook. The required partial derivatives of the mapping equations are evaluated by the special function associated with the Mapping Equations function, called the Derivatives of Mapping Equations. There are three basic techniques for calculating the Derivatives of Mapping Equations which employ three types of algorithms: numerical differentiation (which can be applied to any subject projection), analytic differentiation (which can be applied to those subject projections for which the special mathematical formulas for partial derivatives of mapping equations are known and have been provided by the system), and symbolic differentiation (which can be applied to subject projections with mapping equations which are suitable for application of the symbolic differentiation algorithm). The system automatically chooses the technique most appropriate for a given problem.

The design criteria module displays several possible formulas for area and shape distortion indicators for the user to choose from, the most common ones may be the following two examples:

Example of areal distortion indicator:

$$e_{area} = ab - 1 \tag{3}$$

Example of shape distortion indicator:

$$e_{shape} = \frac{a-b}{a} \tag{4}$$

The system automatically extends these definitions from a single point to the whole sample points field previously defined by the user. The numerical contributions (values of distortion indicators) from a finite number of N points inside the sample points field are summed up by the Distortion Evaluation Module. The most common form of this summation gives the so called mean-squared error measure, defined as the arithmetic mean of the squares of indicators (3) or (4), where the subscript i extends over a set of N Sample Points. For example, the mean-squared areal distortion measure is calculated as $$E_{area} = \frac{1}{N} \sum_{1}^{N} e_{area}^2 = \frac{1}{N} \sum_{i=1}^{N} (a_i b_i - 1)^2. \tag{5}$$

and the mean-squared shape distortion measure is calculated as $$E_{shape} = \frac{1}{N} \sum_{1}^{N} e_{shape}^2 = \frac{1}{N} \sum_{i=1}^{N} \left( \frac{a_i - b_i}{a_i} \right)^2. \tag{6}$$

Other summation techniques, including the robust estimators, are also available for area and shape distortions, leading to different area and shape distortion measures.

There is one more class of distortion measures, which is also based on the parameters a and b of Tissot's Indicatrix, which, however, does not allow for clear interpretation of the results of measurement as representing purely area or purely shape distortions. Instead, the area and shape components are both implicitly present in a single measure in a form of combined mathematical expression which cannot be uncoupled into separate area and shape components. Therefore the result of application of such measures to a subject projection provides only general assessment of the combined area-shape distortion, without any indication of the actual proportions between the area distortion and the shape distortion. Such mixed measures have rather permanent place in cartography mostly for historical reasons. The best known mixed measure is the one used by Airy (1861). It is based on the following two indicators calculated for a single point:

a-distortion indicator:

$$e_a = (a-1) \tag{7}$$

and b-distortion indicator:

$$e_b = (b-1) \tag{8}$$

which together produce the mixed area-shape distortion indicator at this point:

$$e_{mix\,a,b} = \frac{1}{2} [e_a^2 + e_b^2] = \frac{1}{2} [(a-1)^2 + (b-1)^2]. \tag{9}$$

The system automatically extends these definitions from a single point to the whole sample points field previously constructed. The numerical contributions (values of distortion indicators) from a finite number of N points included in the sample points field are summed up by the Distortion Evaluation Module. The most common form of this summation gives the so called mean-squared error measure, which is defined as the arithmetic mean of the average value of the squares of indicators (7) and (8), extended over N Sample Points:

$$E_{mix\,a,b} = \frac{1}{N} \sum_{1}^{N} e_{mix\,a,b} = \frac{1}{N} \sum_{i=1}^{N} \frac{1}{2} [(a_i - 1)^2 + (b_i - 1)^2]. \tag{10}$$

Other summation techniques, including the robust estimators, are also available for mix area-shape distortion measures.

The user can assign one particular distortion measure for each distortion component (distance, area, shape, and mixed area-shape). This establishes a multi-valued distortion measurement system, composed of three or four measurement types or "distortion readouts": the values of distortion components in distance, area, and shape (and mixed area-shape if desired). If the distortion components are normalized this measurement system will be called the distortion spectrum.

This almost completes the user definition of how to measure distortions in the subject projection, by means of three (or four) distortion components. Sometimes, however, it is helpful to describe cartographic distortions by a single-valued measurement—a conglomerate measure of distortion, which combines all or only selected distortion components in form of a single number, a sort of a summary of distortions contained in the subject projection, or the "total distortion score" or "distortion performance" of the projection. To achieve this, the user can define the Distortion Function. Typically, the distortion function is defined by the user as the (possibly weighted) average of the normalized distortion components or as the (possibly weighted) Root Mean Square measure of the distortion components (the "RMS power" of the distortion spectrum). This definition together with the specific coefficients of the distortion function, is kept in the Storage of Distortion Function Coefficients (341) and is later referenced by the Distortion function evaluation module (34).

The user also selects the reference projection (312) as one more important input to the system. The reference projection is used by the distortion components normalization module (32) to normalize distortions. The details and the significance of the normalization will be included in the description of the distortion components normalization module (32).

Block 32 represents the distortion components normalization module. The purpose of this module is to normalize (or calibrate) the measurements of the basic distortion components against some external standard, called the reference projection. The parameters of the reference projection are saved in the parameter storage for reference projection (321), where they can be referenced and used in a way analogous to the use of the parameters of the subject projection.

The concept of distortion normalization may be better explained in analogy to the calibration of any measuring instrument in physical sciences. For example, the mechanical scale must be calibrated (normalized) against the external standard of weight—the international prototype of 1 kilogram—before it can be used to measure the weight of arbitrary objects. In analogy to the mechanical scale (which is a device to measure the amount of mass), the distortion components evaluation module acts as the computational "device" to measure the amount of distortions in any projection. This cartographic device performs several simultaneous measurements or readouts: the values of distortion components in distance, area, and shape, (and mixed area-shape if desired). However, this measuring device must be calibrated or normalized against some standard—in this invention it is the reference projection—before the meaningful measurements of distortions can be applied to the arbitrary subject projection.

During the normalization procedure the distortion components are evaluated (with the help of distortion components evaluation module 33) for the reference projection. The normalization weights are then determined by the distortion components normalization module (one weight per each distortion component) as those multiplicative factors which bring the numerical values of the distortion components in the reference projection to the levels indicative of the relative contribution of each component believed to exist in the reference projection. Such determined normalization weights play the role of the calibration knobs on the mechanical scale. The normalized distortion components have common units, called here the Standard Unit of Distortion (SUD). For example, for a reference projection which is believed to have even distribution of distortions in distance, area, and shape (such projection is often called compromise projection in cartography), the appropriate weighting factors are determined in such a way to bring each distortion component in reference projection to the same normalized magnitude of 1 Standard Unit of Distortion (1 SUD). The normalization weights are saved in the storage of normalization weights (322) for the subsequent use by the distortion components evaluation module (33).

Block 33 represents the distortion components evaluation module. This module performs the measurements of distortion components to the subject projection. During the measurement process, the original formulas for the distortion components in area, shape, and distance (and mixed area-shape if desired) are evaluated for the subject projection as was previously described according to equations (1) through (10). The results are stored in the storage of magnitudes of distortion components of subject projection (331)—they are at this point unnormalized magnitudes of the distortion components in distance, area, and shape, (and mixed area-shape if desired). Finally, these unnormalized magnitudes are being normalized by multiplying each distortion component by the corresponding normalization weight previously determined by the distortion components normalization module (32). This produces the final measurement of the distortions in the subject projection: the normalized magnitudes of distortion components in distance, area, and shape (and mixed area-shape if desired), which form the so called distortion spectrum of subject projection. The distortion spectrum contains all the essential information on the cartographic distortions in the subject projection.

The important feature of the distortion spectrum is that all components of distortions are normalized, which means they are all expressed in terms of the Standard Unit of Distortion (SUD). In analyzing the distortion spectrum, 35 the user can still distinguish between the distortions in distance, area, and shape, (and mixed area-shape if desired) but now he/she can inter-compare different types of distortions to get the extra information on the relative composition of distortions in the subject projection, such as the ratio of the distortion in area to the distortion in shape, and so on.

The utility of the distortion spectrum for cartographic analyses of a given projection can be best explained through the example. Suppose user chose Robinson's projection to serve as a reference projection. To normalize distortion measurements in the subject projection the distortion components normalization module (32) first evaluates all three distortion components in Robinson projection. In general these measurements result in three widely scattered values of the distortion components, each expressed in its own specific natural unit. Next, the user may postulate that this selected reference projection (Robinson) possesses an even balance of all three components of distortion. This user postulate is fulfilled by the distortion components normalization module through the calculation of the normalization weights in such a way that the normalized values of distortion components for Robinson will all adjust to one Standard Unit of Distortion (1 SUD). In other words, the distortion spectrum for this particular reference projection (Robinson's projection) has been normalized to reflect the perfect balance of all kinds of distortions in Robinson's projection. Having determined the normalization weights, the distortion components evaluation module (33) is used as a measuring device to evaluate cartographic distortions in any projection of interest, such as the subject projection. To continue the example, suppose that for particular subject projection the distortion components evaluation module (33) arrived at the following distortion spectrum: distance distortion component—1 SUD, areal distortion component—2 SUD, and shape distortion component—0.5 SUD. The user can interpret these results as follows: the subject projection has four times more distortions in areas than it has distortions in shapes, and it has twice as much distortions in areas than it has distortions in distances. In other wards, this hypothetical subject projection has characteristics which are much closer to the conformality property than to the equal-area or equidistant properties, (perfectly conformal projection would have the normalized shape distortion component evaluated to 0 SUD).

Block 34 represents the Distortion function evaluation module. The purpose of this module is to produce an extra piece of information which can be derived from the distortion spectrum—a sort of a summary of distortions which are contained in the subject projection, or the conglomerate (cumulative) measure of distortions, or the total distortion score of the subject projection. This conglomerate measure is defined by the so called Distortion Function, which was established by the user when working with the design criteria module (31). Most often the Distortion Function is defined as the (possibly weighted) average of the normalized distortion components, or as the (possibly weighted) Root Mean Square measure of these components (the RMS "power" of the distortion spectrum). The coefficients of the Distortion Function (such as weights used in the weighted average) are being retrieved from the Storage of Distortion Function Coefficients, and applied to the previously calculated normalized distortion components of subject projection to produce a conglomerate measure of distortion: the actual value of the Distortion Function for subject projection. The calculated value of the Distortion Function is saved in the Storage of Magnitude of Distortion Function for subject projection for future reference.

Extending the previous example, by defining the Distortion Function to be a simple sum of the three distortion components in the distortion spectrum, the total distortion score of the subject projection would be 1+2+0.5=3.5 SUD. The user may compare this result with any other projection, including the reference projection (by comparison, the cumulative distortion score of Robinson's projection used in previous example as the reference projection would be in this example 3 SUD) Block 35 represents the analyzer module. The purpose of this module is to allow the user to analyze the results of distortion measurements in the subject projection. The main form of this analysis is through creation of interactive visualizations of distortions and ASCII distortion statistics. Visualizations are displayed on the computer screen so that the user can interact with them during the interactive analysis of results. The term "interactive" means that the on-screen visualizations respond to the user graphic composition and formatting commands in real time. For example, the magnification of the distortion bars representing the distortion spectrum can be adjusted by the user in real time (the distortion bars and other visualizations of the distortion spectrum will be described in detail later). In addition to the on-screen interactive visualizations, the user may write the results to a file for future reference, or obtain the hard-copy output.

The information created by the analyzer module can be divided into graphical type and ASCII type. The interactive visualization module (351) is a sub-module responsible for displaying the graphic type distortion information. The interactive ASCII reporting module (352) is a sub-module responsible for the display of the related ASCII type distortion information.

With the aid of interactive visualization module (351) the user may compose many types of visualizations of distortions (collectively represented by the output block 3512) contained in the subject projection. Each visualization can be constructed and analyzed separately, or two or more different visualizations can be constructed and studied together (superimposed on each other). The output is in the form of on-screen visualizations which react in real time to user directives. All these directives or customization parameters (defining graphical properties and other attributes) are being stored in the storage of interactive visualization directives (3511). These parameters reflect user preferences for viewing distortions and are retained from one computer session to the next. Another important function of interactive visualization module is to provide the plot preview capability: if user likes the form of the graphics, he or she may write it to a file (exactly as seen on the screen, which is known as a "what you see is what you get" feature) for future reference, or send it to the plotter to obtain the hard-copy output.

Figure 5:
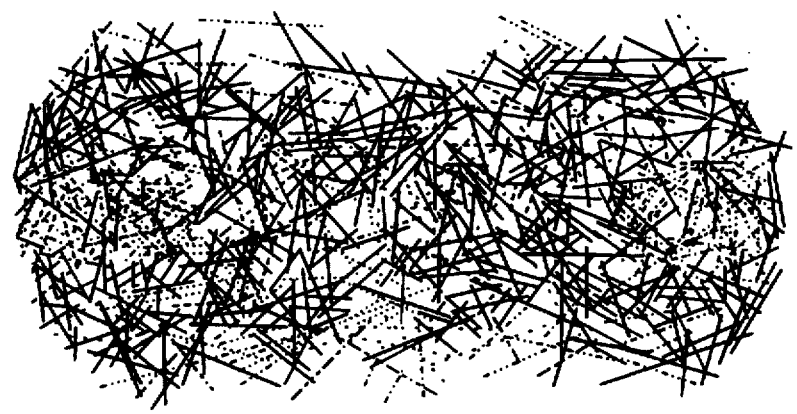
FIG. 5 is a visualization of the distance distortion field for a projection analyzed in accordance with a preferred embodiment of the invention.
Figure 6:
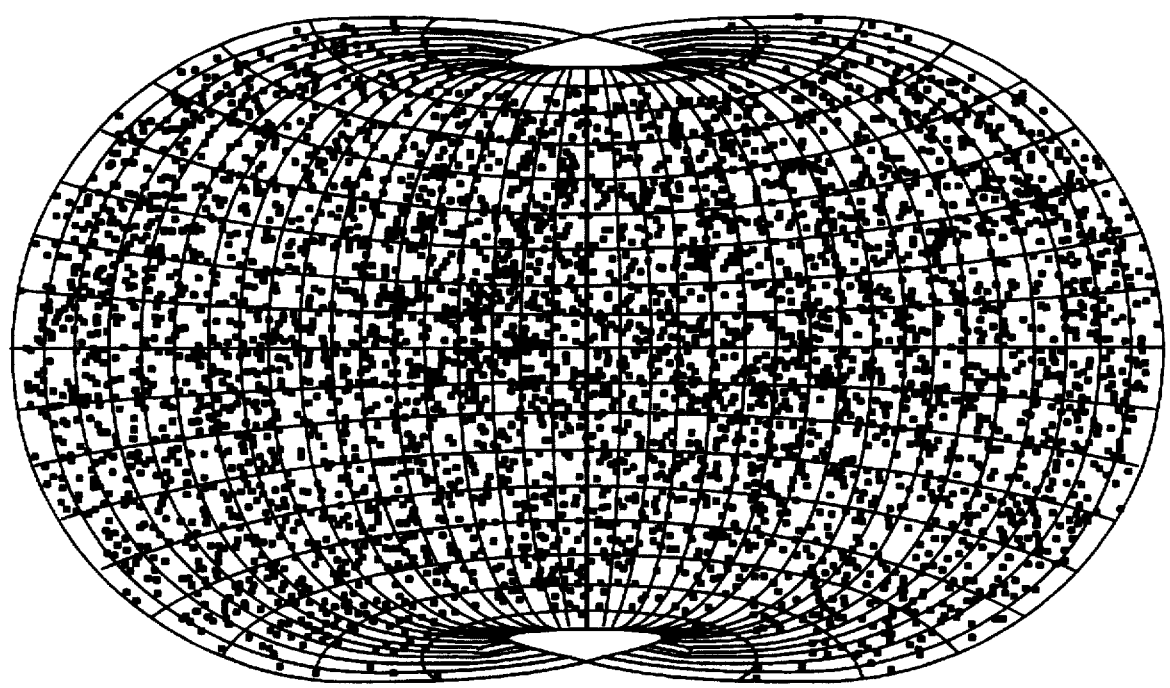
FIG. 6 is a visualization of the sample point field for a projection analyzed in accordance with a preferred embodiment of the invention.

The most important examples of distortion visualizations available from the interactive visualization module (351) are
a) The Distance Distortion Field (FIG. 5).

The distance distortion field for a projection analyzed in accordance with a preferred embodiment of the invention, as described under design criteria module (block 31), can be visualized by plotting each distance as the straight line segment on the subject projection. The user can view not only the spatial locations of distances used in the calculation of the distance distortion component but also the amount of distortion in each individual distance can be signified by the appropriate color (red for expansions, blue for contractions, gray for no change, for example), or by the line thickness (thin for expansions, thick for contractions, normal for no change, for example). This provides a new and important type of distortion display and constitutes the analytical tool not used in cartography prior to the present invention. The color schema for the magnitude of distortion and other attributes of the distance distortion field can be user-controllable in real time. The appropriate legend associated with the distance distortion field (explaining the color schema) can be automatically generated. Other related interactive analyses of distance distortion field can be performed by the user, some examples are: the directional analysis—displays only the distances oriented geographically within the specified range of azimuths, the magnitude analyses—displays only the distances with distortions within the specified range of values, the territorial analyses—displays only the distances contained within the specified region, the direction-magnitude analysis—determines the prevailing direction of maximum distortion, and so on. For each type of analysis the associated distortion statistics can be generated and displayed, such as the value and the location of the most distorted distance, least distorted distance, the displays (and values) of the most and the least distorted directions, the most and the least distorted sub-regions, and other types of statistics. (Even more statistical and tabular data related to the distance distortion field is available from the interactive ASCII reporting module 352, to be described in the next section).

b) Sonification of the distance distortion field.

Another method of analysis associated with the distance distortion field will be called here the Sonification of the distance distortion field. In this new multi-media technique the user may request that an audio signal be generated by some or all of the distances in distance distortion field. The pitch of the signal is in proportion to the amount of distortion contained in a given distance: higher tones for extensions and lower tones for contractions, for example. The user is under impression that the distances in the distance distortion field behave like the vibrating strings of a musical instrument, such as a violin. The physical tension on each string, which determines its pitch, is proportional to the amount of distortion contained in the corresponding distance. The user can excite all of the strings in the distance distortion field at once, or only the selected few, or only the strings in the selected sub-region, or strings positioned in the selected direction, and so on.

c) Stethoscope examination of the distance distortion field.

A specific interactive procedure which anables the distortion analysis based on sonification will be called the "stethoscope examination" of the distance distortion field. In this technique, which is unique for the present invention, the user moves a graphic icon on the screen called the stethoscope (which is a circular graphic representation of the doctor's stethoscope) superimposed over the distance distortion field, and listens to sounds produced only by the distances in the immediate vicinity of the stethoscope.

d) Two graphic representations of the distortion spectrum (FIGS. 7A & 7B).

Figure 8:
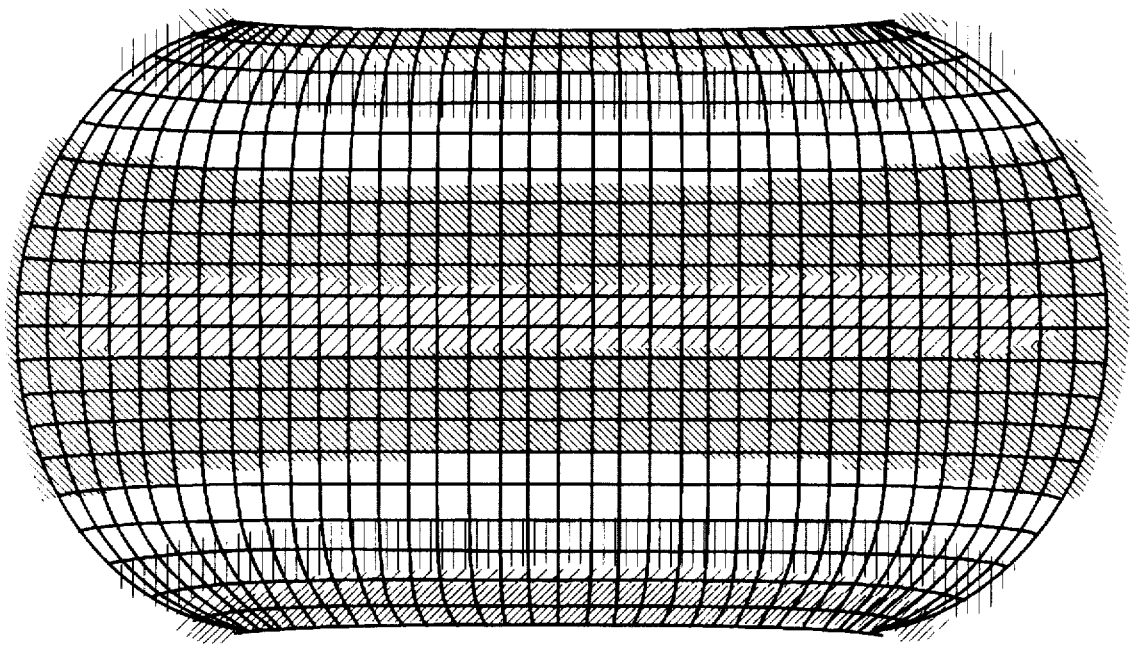
FIG. 8 is a color-filled contour map showing distortion in areas for a projection analyzed in accordance with a preferred embodiment of the invention.

The construction of the distortion spectrum of the subject projection was described under the distortion components evaluation module (block 33) and the preceding modules. In the previous sections of this document the meaning of the distortion spectrum was strictly numerical. It consists of a set of three (or four) numbers which measure the amount of cartographic distortions of the three (or four) basic types contained in the projection: the distortions in distance, area, and shape (and mixed area-shape if desired). These numbers are called the distortion components. This set of distortion components forms the (numerical) distortion spectrum of subject projection, after they have been normalized against the reference projection (normalization procedure is explained under distortion components normalization module (32), and under distortion components evaluation module (33)). To facilitate the quick and easy visual "readout" of the distortion components included in the distortion spectrum, the numerical distortion spectrum can be visualized, as a whole, in two distinct forms. The first form is the bar chart, called here the (graphical) "distortion spectrum", or the "distortion bars", as shown on FIG. 7A. The second form is the pie chart, called here the "distortion dial", as shown on FIG. 7B. Both graphic representations have their own merits. Every subject projection analyzed in accordance with a preferred embodiment of the invention has its own distortion pattern, especially well visible in its (graphical) distortion spectrum (FIG. 7A). The distortion dial (FIG. 7B) shows the relative composition of distortions in the subject projection more effectively. The size of the dial can automatically change in proportion to the sum total of all three components in the distortion spectrum (total distortion score of subject projection defined by the Distortion Function) which, when compared with the size of the distortion dial of the reference projection or with distortion dials of one or more other projections, indicates in a glance the overall quality of the projection under analysis. The geometric proportions, the patterns, color schema, and other graphic attributes of the distortion spectrum and the distortion dial can be user-controllable in real time.

e) The color-filled contour map of distortions in areas (FIG. 8).

Figure 9:
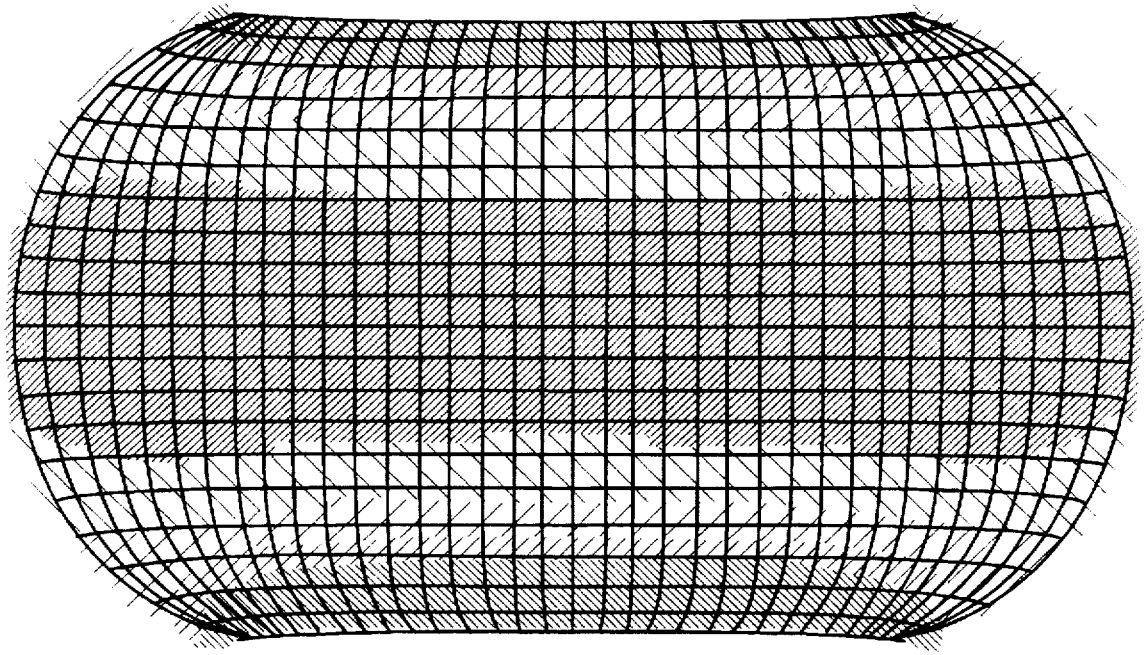
FIG. 9 is a color-filled contour map showing distortion in shapes for a projection analyzed in accordance with a preferred embodiment of the invention.

The spatial distribution of the distortion in area is visualized by constructing the color-filled contour map of distortions in areas on the subject projection. The contours, or isograms, on this map are defined as the lines of constant value of the areal distortion indicator, such as the one given by equation (3) (which was chosen by the user for the calculation of the area distortion component, as described under design criteria module). A standard contouring algorithm similar to the one usually described in the literature on Digital Terrain Models is employed in the construction of this visualization. The legend describing the contour intervals, and the color schema can be automatically generated by the analyzer module. The contour intervals, color schema, and other graphic attributes of the contour map of distortions in areas and its legend can be user-controllable in real time.

f) The color-filled contour map of distortions in shapes (FIG. 9)

The spatial distribution of the distortion in shape is visualized by constructing the color-filled contour map of distortions in shapes on the subject projection. The contours, or isograms, on this map are defined as the lines of constant value of the shape distortion indicator, such as the one given by equation (4) (chosen by the user for the calculation of the shape distortion component, as described under design criteria module). A standard contouring algorithm similar to the one usually described in the literature on digital terrain models is employed. The legend describing the contour intervals, and the color schema can be automatically generated by the analyzer module. The contour intervals, color schema, and other graphic attributes of the contour map of distortions in shape and its legend can be user-controllable in real time.

g) The contour map of mixed area-shape distortions.

Figure 10:
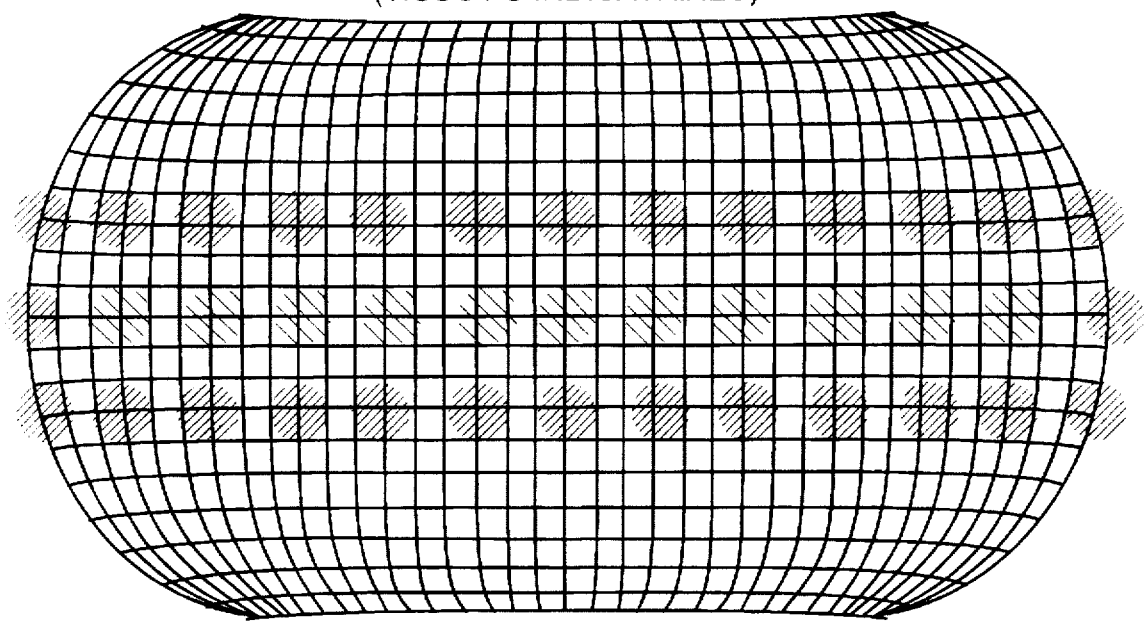
FIG. 10 is a map showing ellipses of distortions based on Tissot's indicatrices for a projection analyzed in accordance with a preferred embodiment of the invention.

The spatial distribution of the mixed area-shape distortion is visualized by constructing the contour map of mixed area-shape distortions on the subject projection. The contours or isograms on this map are defined as the lines of constant value of the mixed area-shape distortion indicator, such as the one given by equation (9) (chosen by the user for the calculation of the mixed area-shape distortion component, as described under design criteria module). A standard contouring algorithm similar to the one usually described in the literature on digital terrain models is employed. The legend describing the contour intervals, and the color schema can be automatically generated by the analyzer module. The contour intervals, color schema, and other graphic attributes of the contour map of mixed area-shape distortions and its legend can be user-controllable in real time. (The illustration of this contour map is similar to the two previous distortion visualizations, so it is not included here).

h) Map of ellipses of distortions, known as Tissot's Indicatrices (FIG. 10).

Different but equally important visualization of the mixed area-shape distortions is created by plotting the ellipses of distortions, known in cartography as Tissot's Indicatrices, on the subject projection. Indicatrices are plotted at the user specified intervals. They can appear all in one color, or the color may vary depending on some other distortion characteristics chosen by the user. For example, the color of the Indicatrix may indicate the value of the areal distortion indicator at the center of that Indicatrix. The associated analyses that can be performed on Indicatrices are: sorting Indicatrices by size, by orientation, by flatness, and so on. The legend describing the color schema can be automatically generated by the analyzer module. The legend, and other graphic attributes of Indicatrices (such as relative sizes) can be user-controllable in real time.

i) Floating indicatrix.

The "floating indicatrix" visualization and distortion analysis technique is a highly interactive version of distortion analysis based on Tissot's Indicatrices. In this technique the user can drag (with a mouse or by using arrow keys on the keyboard) a single graphic representation of the Indicatrix, superimposed on the graticule (or on any other type of display) on the subject projection. As the location of its center changes, the Indicatrix changes its size, shape, and color in real time to reflect the changes in the local behavior of distortions.

j) The contour map of distortions along parallels of latitude.

An important type of distortion analyses is accomplished by constructing the contour map of distortions along parallels of latitude on the subject projection. This characteristic of distortion is known in cartography as the scale factor k. The definition of scale factors can be found in Snyder (1987), chapter 4. The contours, or isograms, on this map are defined as the lines of constant value of the scale factor k. A standard contouring algorithm is employed. The legend describing the contour intervals, and the color schema can be automatically generated by the analyzer module. The contour intervals, color schema, and other graphic attributes of the contour map of k-variation and its legend can be user-controllable in real time.

k) The contour map of distortions along the meridians.

An important type of distortion analyses is accomplished by constructing the contour map of distortions along the meridians on the subject projection. This characteristic of distortion is known in cartography as the scale factor h. The definition of scale factors can be found in Snyder (1987), chapter 4. The contours, or isograms, on this map are defined as the lines of constant value of the scale factor h. A standard contouring algorithm is employed. The legend describing the contour intervals, and the color schema can be automatically generated by the analyzer module. The contour intervals, color schema, and other graphic attributes of the contour map of h-variation and its legend can be user-controllable in real time.

l) Single contour threading.

Figure 11:
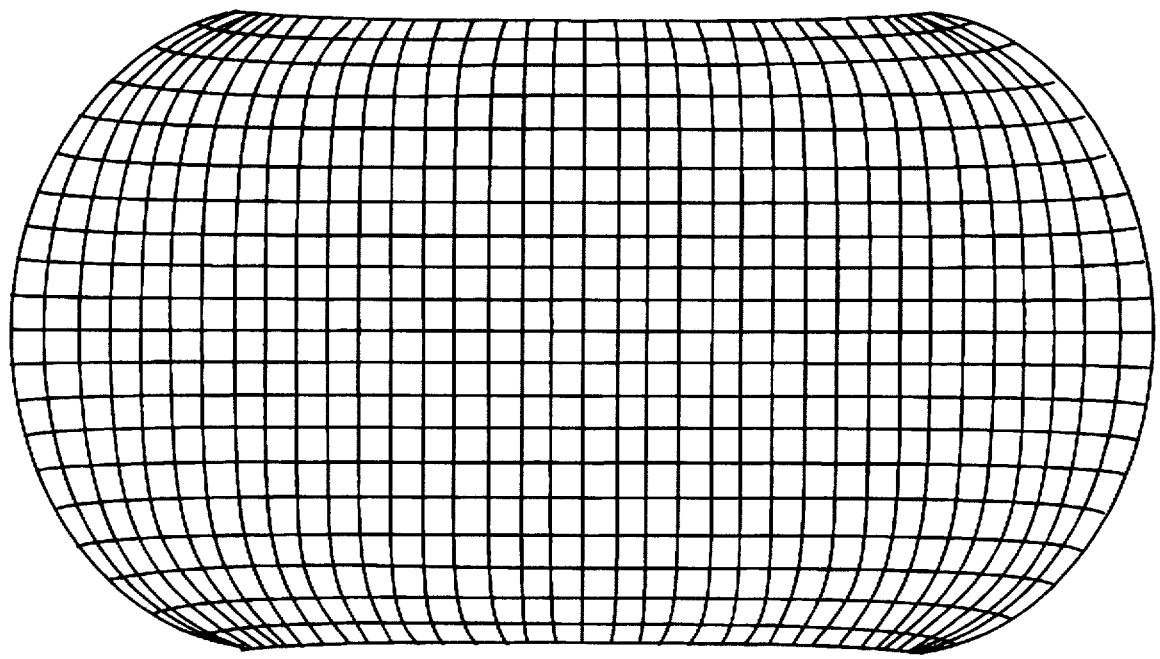
FIG. 11 is a graticule (lines representing geographic meridians and parallels) for a projection analyzed in accordance with a preferred embodiment of the invention.

One important variation of the distortion analyses, which are based on the contour mapping of any distortion field, is a technique which may be called the "single contour threading". In this type of interactive visualization the user specifies the single value of the contour and the system creates and displays a single contour, or isogram, corresponding to the selected value. The user can adjust the value using the slider-like graphic gadget on the screen and observe the corresponding contour being recreated in real time. A little arrow, or the whole array of arrows, is attached to the contour showing the direction in which distortions increase.

m) The graticule (FIG. 11).

Figure 12:
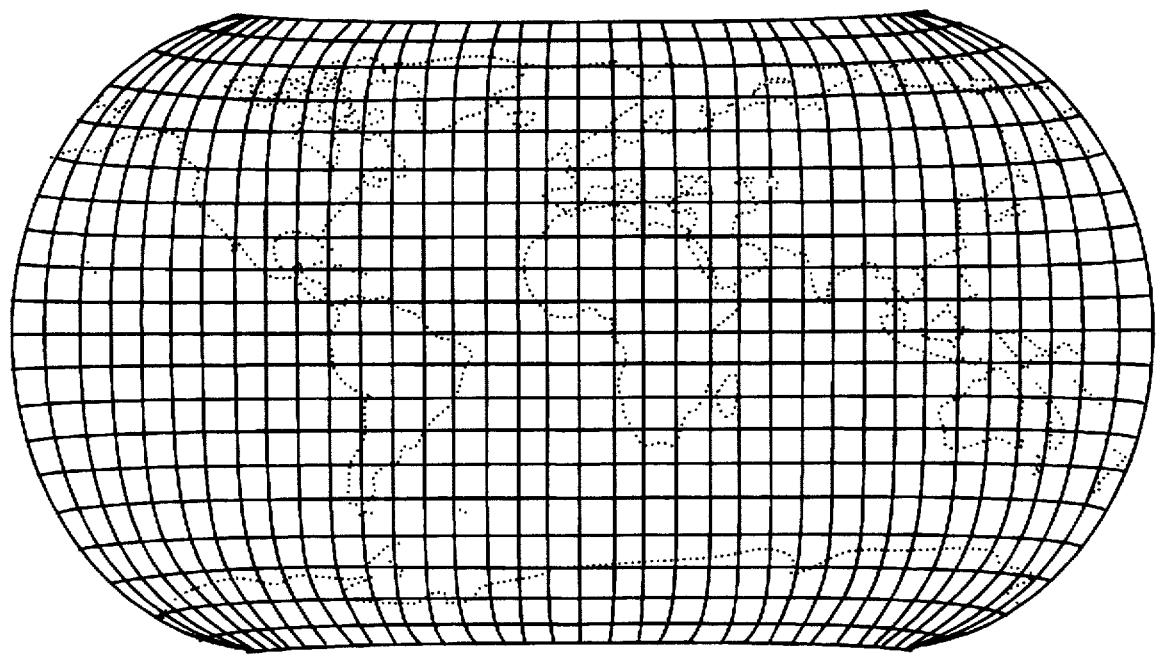
FIG. 12 shows the continental shoreline for a projection analyzed in accordance with a preferred embodiment of the invention.

The graticule is the set of lines of constant longitude and latitude values drawn on the subject projection. The line spacing and other graphic attributes can be user-controllable in real time.

n) Continental shoreline (FIG. 12).

Continental shoreline can be displayed on the subject projection, which may be generated from the geographic database, such as the Digital Chart of the World (DCW). The types of features included (like rivers, borders, . . . ), their attributes, and the level of generalization (which depends upon the desired map scale) can be user-controllable in real time.

The analyzer module can also create an ASCII type of information about the distortions in the subject projection (in form of numerical tables and graphs). Interactive ASCII reporting module (352) is a sub-module responsible for generation of the ASCII type distortion reports. The user may compose many types of ASCII reports of distortions (collectively represented by block 3522) contained in the subject projection with the aid of interactive ASCII reporting module. The output is in the form of on-screen displays which react in real time to user directives. All these directives or customization parameters (attributes of tables and graphs) of the ASCII type distortion information are being stored in the storage of interactive ASCII report directives (3521). These parameters reflect user preferences for reporting distortions in ASCII form and are retained from one computer session to the next. Another important function of interactive ASCII reporting module is to provide the print preview capability: if user likes the form of the report, he or she may write it to a file for future reference, or send it to the printer to obtain the hard-copy output.

Only most important examples of ASCII reports available from the interactive ASCII reporting module (352) are mentioned here (in general every type of visualization available from the interactive visualization module 351 can have its associated ASCII type report):

a) Numerical distortion spectrum.

These are the numerical values of the basic distortion components in the subject projection (described under the distortion components evaluation module 33).

b) Numerical values of the alternative expressions of distortion components.

For each distortion component an alternative formula for the distortion measure can be (optionally) selected by the user with the help of design criteria module (in addition to the main formula chosen). These alternative formulas are evaluated and normalized by distortion components evaluation module 33 in parallel to the main formulas. These alternative values are important in comparative analyses of the effectiveness of various mathematical expressions for describing distortions.

c) The conglomerate, or total, distortion measure.

This is the value of the distortion function for the subject projection (see the description of the Distortion function evaluation module 34). This conglomerate measure plays the role of the total distortion score of a projection, and is an indicator of the distortion performance of subject projection, which can be compared with other projections (when, for example, selecting the best projection for a given purpose).

d) Normalization weights.

These are the numerical weighting factors used in the normalization of the distortion components (see the description of the distortion components normalization module 32)

e) Statistics describing the distance distortion field.

These are numerical statistical data, such as a number N of distances used to construct the distance distortion field, the data about probability distribution of distances, the minimum and maximum size of distance used, the location and values of distances with the extremum (minimum and maximum) distortions, and more (see the description of the design criteria module 31).

f) Statistics describing areal, shape, mixed area-shape distortions.

These can include the number N of sample points used to construct the given distortion field, the location and values of the extremum (minimum and maximum) distortions, and other characterizations suitable for ASCII format.

Block 36 represents the Off-line analysis generator module. The purpose of this module is to automatically create visualizations of distortions, as performed by submodule 361, and ASCII distortion reports for the subject projection based on the default set of directives supplied by the system, as performed by submodule 362. Similarly to the data structures associated with the analyzer module (35), the default set of directives for the off-line analysis generator module describes formats and attributes of visualizations and ASCII distortion reports to be automatically created for the user. The graphic visualizations and ASCII reports are written to the graphic and ASCII files respectively (see output blocks 3612 and 3622) for future reference by the user. The generation of visualizations and statistics occurs off-line, which means the user does not interact with this process (once started) and does not see any related effects except the notification of the completion (or failure). The Off-line analysis generator module works "in the background", which means that (after the user starts the Generator process) the user may work independently with any other module in the system, such as the design criteria module (31), or the analyzer module (35).

The default set of directives controlling the attributes of visualizations and ASCII reports is provided by the system in the Storage of automatic visualization directives (3611) and in the Storage of automatic ASCII report directives (3621). The content of this storage is independent from the contents of the Storage of interactive visualization directives (3511) and the Storage of interactive ASCII report directives (3521) as described for the analyzer module (35). The user may adjust the contents of this storage and customize the directives to his/her needs at any time. In particular, the user may select which visualizations and reports to generate. Also, the user may make all or parts of the automatic directives storage used by the Off-line analysis generator module (36) to coincide with the interactive directives storage used by the analyzer module (35).

SYSTEM FOR FINDING NEW MAP PROJECTIONS

Figure 4:
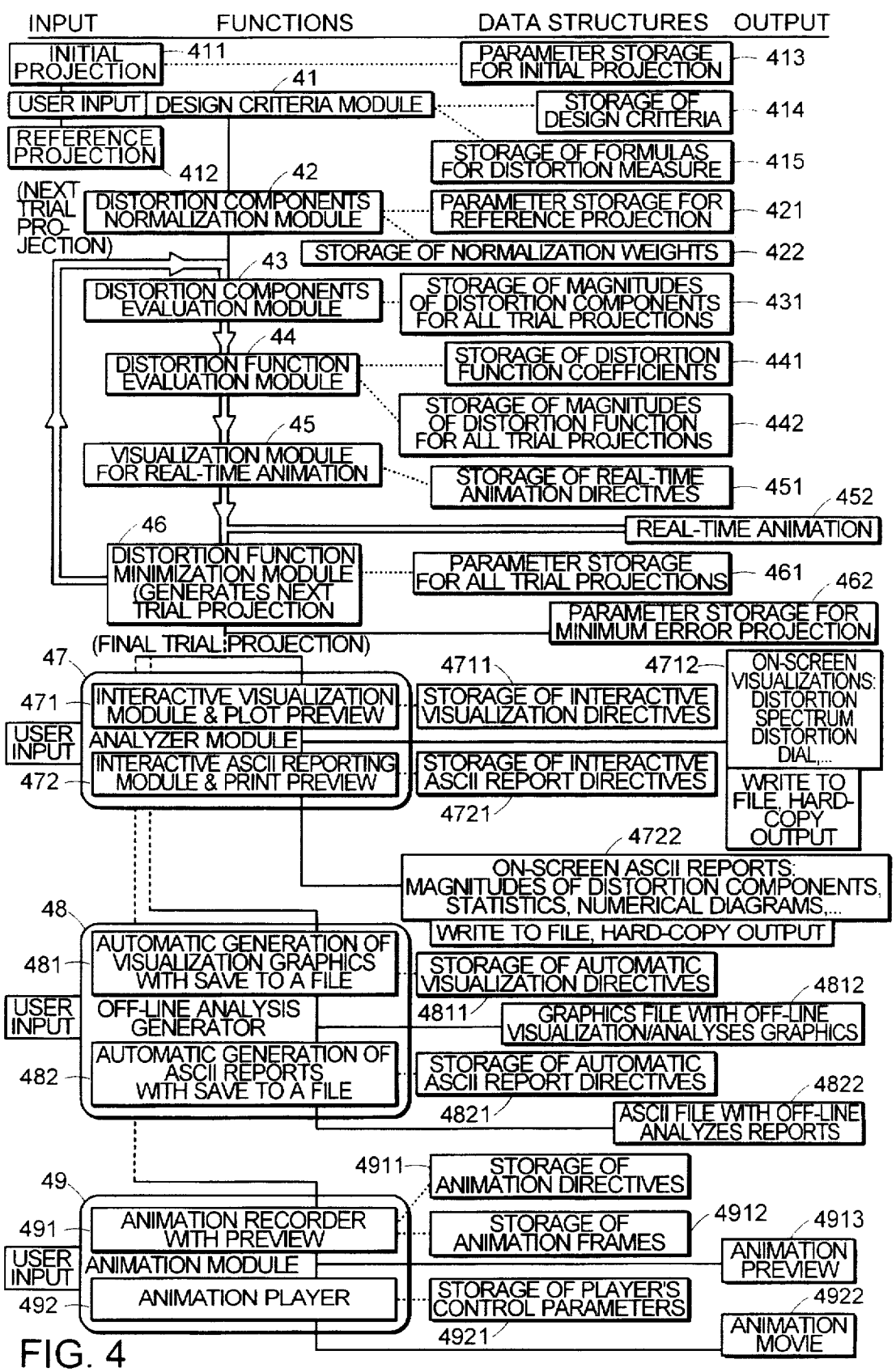
FIG. 4 is a diagram of the detailed structure of the embodiment of FIG. 2.

FIG. 4 illustrates the detailed configuration of the system of FIG. 2 for finding new minimum-error map projections. Many software components on FIG. 4 are identical or are similar to the software components used by the system for evaluation of distortions in a projection, as depicted on FIG. 3. In fact, if both systems were to be implemented together on the same computer system, all of the modules used by the system for evaluation of distortions could be also used (after some modification and extension) by the system for finding new map projections. Similarly, many data structures and algorithms could have been shared by both systems. Because the system for finding new projections can be developed separately (as it functions completely autonomously), it will be separately and completely described here.

The software components on the diagram on FIG. 4 are arranged from left to right in the following order: Input (information taken from the user), Functions (basic functions performed by each module), Data Structures (organization and storage of the basic data which support working of the basic functions and enable the exchange of information among basic modules), and Output (results displayed to the user). The software components on FIG. 4 are also arranged from top to bottom to reflect the chronology of events in a typical user work flow.

Block 41 represents the design criteria module. During an Interactive computer session the user enters all sorts of information which affects the design of the sought for minimum-error projection. This information includes defining the Initial Projection (411), the reference projection (412), and describing specific directives how to measure cartographic distortions in the Initial Projection and in all consecutive Trial Projections, including the resultant minimum-error projection. This information also includes the numerical and geometric constraints describing the desired properties of the resultant minimum-error projection.

The user identifies the Initial Projection (which is used as the first Trial Projection from which the distortion minimization process begins) by selecting its name from the list of all projections provided by the system. After selecting the name of the projection the user defines (if necessary) its specific parameters. Parameter storage for Initial Projection (413) is the basic data structure describing all necessary parameters characterizing the Initial Projection. This structure includes parameters of the Earth's Ellipsoid, and a set of unique projection parameters (which depend on the type of projection), such as the two standard parallels in case of Lambert Conformal Conic projection. A function called the Mapping Equations accompany each such structure. Other modules in the system require Mapping Equations together with the projection parameters and the parameters of Earth's Ellipsoid to calculate a set of (X,Y) coordinates on the projection (called the projection coordinates) from a set of ($\lambda$, $\phi$) coordinates on the globe (called the longitude and latitude coordinates, or geographic coordinates, for short). This basic calculation is required by various modules, repeatedly and many times during the user work flow. (It is the most basic calculation performed by the distortion components evaluation module (43) to be described in details further on). A good source of mapping equations can be found in (Snyder, 1987). As a supplement to a large variety of the specialized data structures describing more than thirty basic projection types of common use in cartography, the unified polynomial data structure (if polynomial parameters are known) can be alternatively used to describe the Initial Projection. The Mapping Equations that accompany such a polynomial data structure contain a polynomial approximation to the original mapping equations, which produce equivalent numerical results, but execute much faster than the original specialized Mapping Equations. The techniques of using polynomials for mapping equations are described in (Snyder, 1985) and (Canters, 1989). Also associated with the Mapping Equations and with the parameter storage for the Trial Projection is a function to evaluate the partial derivatives of mapping equations, called the Derivatives of Mapping Equations. The formulas for the derivatives of mapping equations (known in cartography as the scale factors) for many commonly used projections can be found in (Snyder, 1987). The Derivatives of Mapping Equations are used by the distortion components evaluation module (43) to calculate the distortion components which are based on the properties of the distortion ellipse, known in cartography as Tissot's Indicatrix. The theory and the computational formulas related to the Tissot's Indicatrix can be found in (Laskowski, 1989), or in (Richardus et al., 1972, chapter 7).

The information defining the projection class is entered next. The projection class defines the domain of all possible projections among which the one with the smallest distortions will be selected as the desired minimum-error projection. Typical example of the projection class is the polynomial class, where all the Trial Projections and the final minimum-error projections are polynomials of the user-specified degree. If the user selects the Initial Projection which is a polynomial, it will be used directly as the first Trial Projection by the process of minimization of distortions. The modifiable parameters for polynomial class of projections are polynomial coefficients. If the user selects the Initial Projection which is not a polynomial, and the required class of projections is polynomial, then the Initial Projection must be transformed to a polynomial form by means of the least squares method and a set of control points. This transformation can be performed automatically by the Design Criteria module without user intervention. The result is a polynomial approximation to the Initial Projection, which will be used as the first Trial Projection in the process of minimization of distortions.

Another example of projection class is the conformal conic class. If this is selected by the user, the Initial Projection must be in the conformal conic class, and all the subsequent Trial Projections and the resultant minimum-error projection will belong to this class. All these projections have non-polynomial mapping equations that are characteristic to the Lambert Conformal Conic projection, and the modifiable parameters for this class are the two standard parallels.

The information on the constraints is enter next. Constraints are the numerical and geometric conditions imposed on the resultant minimum-error projection. A typical example of the constraint is the condition that the north and south poles be represented as points (as opposed to lines or curves) on the resultant minimum-error projection. The constraints can best be understood as modifiers or the extra conditions superimposed on the selected projection class. For example, if the projection class is 5-degree polynomial, the domain of the minimization algorithm consists of all 5-degree polynomials possible. If the constraint condition is selected, such as the mentioned "point-pole" constraint, it modifies the broad original class of all 5-degree polynomials to a much narrower class of 5-degree polynomials having the point representation for their north and south poles. A typical and expected effect of any constraint is the increase in the distortion content of the resultant minimum-error projection, as compared to the un-constraint solution. Some other examples of constraints are: symmetries (for example north-south symmetry), and the end-conditions for certain graticule components (for example the direction of the end points of the +180 and the −180 degree meridians). The techniques for applying constraints to the polynomial class of projections are described in (Canters, 1989).

The information describing how to measure distortions is entered next. This information is kept in the data structure called the storage of design criteria (414). It consists of the geometric part and the algebraic part.

In the geometric part the user describes the spatial distribution of the sample points at which distortion measurements will be obtained by the distortion components evaluation module (43). First, the geographic region is defined. The sample points will be placed only inside this region, which usually coincides with the entire rectangular region initially shown on the Initial Projection (the entire Earth's surface in case the Initial Projection is the world map). Irregular regions can also be specified, with boundaries which follow, for example, the outlines of the continents. To facilitate the option of selecting the irregular geographic region in the program, the access to the worldwide database of continental shoreline (such as the Digital Chart of the World) is provided. In case of the irregular region the placement of sample points and the measurement of distortions will be confined only to the specified irregular region, such as to the land areas only, or to the oceanic areas only, depending on the user selection. Next, the statistical probability distribution (such as gridded, random, non-random) for the collection of sample points is defined. In the most common application, in case the subject projection is the world map, the sample points are placed uniformly (random or on a grid) on the entire surface of the globe. To achieve the true spatial uniformity, the convergence of meridians towards the poles must be accounted for. This is achieved by selecting points by random from the equivalent region projected on the flat plane of the cylindrical equal-area projection (using uniform probability distribution) and then re-projecting points back (using inverse mapping equations of this equal-area projection) on to the corresponding longitude and latitude locations on the globe. Other non-uniform probability distributions of sample points (such as normal distribution) are also available from the design criteria module, as well as the non-random distributions determined by the user (such as gridded). In case the irregular region was identified, during the process of random selection of sample points according to any specified statistical probability distribution, the points which fall outside the region are being simply ignored.

Two sets of sample points are constructed: a set of pairs of points to measure distance distortions, called the distance distortion field, and a set of points to measure area, shape, and mixed area-shape distortions called the sample points field.

The Distance Field can be constructed through the following procedure. First, the beginning points of all distances are selected according to the specified statistical probability distribution. Then, for each beginning point the direction towards its end point is selected by random with uniform probability distribution (by the random drawing from 0 to 360 Degree range), and the distance to its end point along this direction is selected by random with uniform probability distribution (by the random drawing from the user-specified range of distance$_{min}$ to distance$_{max}$). In case the end point falls outside the region of interest, the distance from the beginning point to the end point can be shorten until the end point falls inside the region. The user can control the number N of the desired pairs of points in the such created distance distortion field. Also, the user can visually inspect the resultant distribution of distances by viewing all the distances plotted on the subject projection which compose the visualization called the "Map of distance distortion field" (FIG.5)

The sample points field used in the process of measurement of the area, shape, and mixed area-shape distortions can be constructed through the following procedure. The set of pairs of points used to measure distance distortions (the distance distortion field) are constructed first by the procedure previously described. Then the points needed for area, or shape, or mixed area-shape distortion calculation are selected at the midway of each distance. More specifically, for each distance (defined by a specific pair of beginning and end points) the newly constructed point in the Sample Point Field is placed at the mid-latitude and mid-longitude location determined as follows: the mid-latitude is the average of latitudes of the beginning and end points, and the mid-longitude is the weighted average of longitudes of the beginning and the end points, using cosines of latitudes of the beginning and end points as numerical weights. That way the possible spatial bias between the area (or shape) measurements and the distance measurements is prevented. The user can visually inspect the resultant distribution of points by viewing a "Map of sample points field" which the system can display separately or on top of the previously created "Map of distance distortion field". Once created, the information on the sample points field and on the distance distortion field is kept as part of the Storage of design criteria (414).

In the algebraic part of the specifications defining how to measure distortions the user defines the exact mathematical formulas for the distortion measures to be used for each of the distortion component: of distance, area, shape, and mixed area-shape type. The user can select the desired mathematical formula for each distortion component from a large set of known distortion measures as well as the newly constructed measures having parameters modifiable by the user. The user can browse through the collection of available equations as well as through the associated graphical representations of each equation. The sources of formulas for distortion measures are scattered in the cartographic literature. The best collection can be found in (Meshcheryakov, 1965), (Biernacki, 1965), and (Canters and Decleir, 1989).

Before giving the details on the calculation of various distortions in the present invention, the treatment of the nominal map scale will be explained. In measuring cartographic distortions, we are not interested in the "Xerox-copy" uniform reduction effect due to the nominal scale of a map. In the cartographic tradition, as well as in the present invention, this uniform reduction (which is equivalent to the similarity transformation which maintains the constant scale for all distances independently of their location, orientation, or length) is not considered cartographic distortion, and is excluded from the distance distortion analysis. In concept, we free ourselves from the dependence on the nominal scale of the map by considering instead of the actual Earth its perfect theoretical model, called the globe, which is reduced to the nominal scale of a map. Any measurement of distance on the Earth, in the present invention, actually takes place on this perfect model. Comparisons of these distances on the globe with the corresponding distances on the map lead to the distortion analysis which is independent of the nominal scale of the map. Being the Earth's perfect model in all aspects, the globe does actually involve one idealization: the irregular topography of the real Earth is disregarded and the globe is treated as the perfect ellipsoid (or as the perfect sphere depending on the application).

The methodology of measuring distances and distortion in distances will be now presented. The distances on the globe, denoted by D, will be most often measured along geodesic lines on the surface of the globe. Geodesic (or geodesic line) is defined as the shortest path between the two end points on a ellipsoid or on a sphere (on a sphere geodesic coincides with the great circle arc). The user may choose to treat the globe as a perfect ellipsoid or as a perfect sphere. Depending on his/her choice, the system will automatically apply the appropriate geodetic formulas for calculation of geodesic on the ellipsoid or on the sphere respectively. The system also offers other types of distance D on the globe which are not based on geodesic (such as the normal section distance on ellipsoid, the spatial chord, or the line-of-sight distance in 3-dimensional Euclidean space, and others). The actual calculations of distance D on the globe are based on the standard formulas for geodesic (and other types of distances) as described in any standard geodesy textbook, such as "Geodesy the concepts" by Vanicek et al. (1986), or "Geodesy" by Bomford (1980).

The corresponding distance on the subject projection, denoted by d, is measured along the straight line segment on the subject projection connecting the two end points, which are the projections of the two end points of the corresponding distance D on the globe. First the user defines the distortion of any single distance by selecting an elementary mathematical expression (called the distortion indicator) which involves two distance measurements: D on the globe, and d on its corresponding image on the subject projection. The design criteria module displays several possible formulas for the distance distortion indicators (which are kept in the Storage of Formulas for Distortion Measures 415) for the user to choose from, the most common example of distance distortion indicator is given by the equation (1).

The system automatically extends this definition from a single distance to the whole distance distortion field previously constructed. The numerical contributions (values of distortion indicators) from a finite number of N distances included in the distance distortion field are summed up by the distortion components evaluation module (43). The most common form of this summation gives the so called mean-squared error measure, defined as the arithmetic mean of the squares of the indicators (1), where subscript i extends over the N distances included in the distance distortion field, as indicated in equation (2).

Other summation techniques, including the robust estimators, are also available, producing a variety of possible distance distortion measures.

The methodology of calculating distortions in area, shape, and mixed area-shape distortions will be now explained. Distortion in area and distortion in shape at a single point are described by elementary expressions (called areal and shape distortion indicators) which involve the parameters a and b of Tissot's Indicatrix. The parameters a and b are automatically calculated by the distortion components evaluation module (43) for any point in the sample points field, using the formulas published in (Laskowski, 1989) or in any standard cartography textbook. The required partial derivatives of the mapping equations are evaluated by the special function associated with the Mapping Equations function, called the Derivatives of Mapping Equations. There are three basic techniques for calculating the Derivatives of Mapping Equations which employ three types of algorithms: numerical differentiation (which can be applied to any projection), analytic differentiation (which can be applied to those projections for which the special mathematical formulas for partial derivatives of mapping equations are published and have been provided by the system), and symbolic differentiation (which can be applied to projections with mapping equations which are suitable for application of the symbolic differentiation algorithm). The system automatically chooses the technique most appropriate for a given problem. The design criteria module displays several possible formulas for area and shape distortion indicators for the user to choose from, the most common example of areal distortion indicator is given by equation (3), and the most common example of shape distortion indicator is given by equation (4).

The system automatically extends these definitions from a single point to the whole sample points field previously defined by the user. The numerical contributions (values of distortion indicators) from a finite number of N points inside the sample points field are summed up by the Distortion Evaluation Module. The most common form of this summation gives the so called mean-squared error measure, defined as the arithmetic mean of the squares of indicators (3) or (4), where the subscript i extends over a set of N Sample Points. For example, the mean-squared areal distortion measure is calculated according to equation (5), and the mean-squared shape distortion measure is calculated according to equation (6).

Other summation techniques, including the robust estimators, are also available for area and shape distortions, leading to different area and shape distortion measures.

There is one more class of distortion measures, which is also based on the parameters a and b of Tissot's Indicatrix, which, however, does not allow for clear interpretation of the results of measurement as representing purely area or purely shape distortions. Instead, the area and shape components are both implicitly present in a single measure in a form of combined mathematical expression which cannot be uncoupled into the separate area and shape components. Therefore the result of application of such measures to a projection provides only general assessment of the combined area-shape distortion, without any indication of the actual proportions between the area distortion and the shape distortion. Such mixed measures have rather permanent place in cartography mostly for historical reasons. The best known mixed measure is the one used by Airy (1861). It is based on two indicators calculated for a single point: the a-distortion indicator, given by equation (7), and the b-distortion indicator, given by equation (8). These two indicators together produce the mixed area-shape distortion indicator given by equation (9).

The system automatically extends these definitions from a single point to the whole sample points field previously constructed. The numerical contributions (values of distortion indicators) from a finite number of N points included in the sample points field are summed up by the Distortion Evaluation Module. The most common form of this summation gives the so called mean-squared error measure, which is defined as the arithmetic mean of the average value of the squares of indicators (7) and (8), extended over N Sample Points. The formula for the resultant mean-squared error measure is given by equation (10).

Other summation techniques, including the robust estimators, are also available for mix area-shape distortion measures.

The user can assign one particular distortion measure for each distortion component (distance, area, shape, and mixed area-shape). This establishes a multi-valued distortion measurement system, composed of three or four measurement types or "distortion readouts": the values of distortion components in distance, area, and shape (and mixed area-shape if desired). If the distortion components are normalized, this measurement system will be called the "distortion spectrum".

The definition of distortion function is entered next. Typically, the distortion function is defined by the user as the weighted average of the normalized distortion components or as the weighted Root Mean Square measure of the distortion components (the "RMS power" of the distortion spectrum). This definition, together with the coefficients of the distortion function, is kept in the Storage of Distortion Function Coefficients (441), and is later referenced by the Distortion function evaluation module (44).

For the purpose of minimization of distortion by means of the optimization algorithm (described later with the Distortion Function Minimization Module, 46) it is necessary to describe cartographic distortions by a single-valued measurement—a conglomerate measure of distortion, which can combine all or only selected distortion components in form of a single number, a sort of a summary of distortions contained in a projection, or the "total distortion score" or "distortion performance" of the projection. The Distortion Function plays the role of such single-valued measurement. The objective of the optimization algorithm is to minimize the distortion function. Beginning with the first Trial Projection (given by the Initial Projection), the optimization algorithm modifies one or more of modifiable parameters of the current Trial Projection in such a way to reduce the magnitude of the distortion function. The such modified set of parameters defines the next Trial Projection, having less cartographic distortions than any of its predecessors. The optimization algorithm may create the whole sequence of Trial Projections. Eventually, when for some Trial Projection the distortion function cannot be lowered any further, this final Trial Projection becomes the desired minimum-error projection. By choosing the appropriate magnitudes for the coefficients of the distortion function the user can control the relative composition of different distortion components in the resultant minimum-error projection. For example, choosing the coefficients to be all equal to one (as in the simple sum of all distortion components) will cause the optimization algorithm to minimize all the distortion components with the "even force", which will likely produce the minimum-error projection with even composition of all distortion components. However, choosing one coefficients (for example the coefficient of the area distortion component) to be twice the magnitude of the remaining coefficients will cause the optimization algorithm to minimize this privileged distortion component with "twice the force" with which it minimizes the remaining coefficients. This will most likely produce the resultant minimum-error projection which has only half as much of the privileged distortion (area distortion, in our example) than other distortions. In the extreme cases, by selecting one or more coefficients of the distortion function to be thousand or million times bigger than the remaining coefficients will tend to eliminate the privileged distortions from the resultant minimum-error projection altogether (producing the equal-area minimum-error projection, in our example, which is devoid from any distortions in areas).

The user also selects the reference projection (412) as one more important input to the system. The reference projection is used by the distortion components normalization module (42) to derive the normalization weights which normalize distortions. The details and the significance of the normalization will be included in the description of the distortion components normalization module (42).

Block 42 represents the distortion components normalization module. The purpose of this module is to normalize (or calibrate) the measurements of the basic distortion components against some external standard, called the reference projection. The parameters of the reference projection are saved in the Parameter Storage for reference projection (421), where they can be referenced and used in a way analogous to the use of the parameters of the Initial Projection.

The concept of distortion normalization may be better explained in analogy to the calibration of any measuring instrument in physical sciences. For example, the mechanical scale must be calibrated (normalized) against the external standard of weight—the international prototype of 1 kilogram—before it can be used to measure the weight of arbitrary objects. In analogy to the mechanical scale (which is a device to measure the amount of mass), the distortion components evaluation module acts as the computational "device" to measure the amount of distortions in any projection. This cartographic "device" performs several simultaneous measurements or readouts: the values of distortion components in distance, area, and shape, (and mixed area-shape if desired). However, this measuring device must be calibrated, or normalized, against some external standard—in this invention it is the reference projection—before the meaningful measurements of distortions can be applied to the Initial Projection and to any of the Trial Projections.

During the normalization procedure the distortion components are evaluated (with the help of distortion components evaluation module 43) for the reference projection. The normalization weights are then determined by the distortion components normalization module (one weight per each distortion component) as those multiplicative factors which bring the numerical values of the distortion components in the reference projection to the levels indicative of the relative contribution of each component believed to exist in the reference projection. Such determined normalization weights play the role of the calibration knobs on the mechanical scale. The normalized distortion components have common units, called here the Standard Unit of Distortion (SUD). For example, for a reference projection which is believed to have even distribution of distortions in distance, area, and shape (such projection is often called compromise projection in cartography), the appropriate numerical weighting factors are determined in such a way to bring each distortion component in reference projection to the same magnitude of 1 Standard Unit of Distortion (1 SUD). The normalization weights (numerical factors) are saved in the storage of normalization weights (422) for the subsequent use by the distortion components evaluation module (43).

Block 43 represents the distortion components evaluation module. This module performs the measurements of distortion components in the Initial Projection, and all the Trial Projections, including the final minimum-error projection. During the measurement process, the original formulas for the distortion components in area, shape, and distance (and mixed area-shape if desired) are evaluated for the Initial Projection as well as for all the subsequent Trial Projections, as was previously described according to equations (1)

through (10). The Initial Projection is treated as just the first Trial Projection in the whole sequence of Trial Projections to be generated by the process of minimization of distortions. The results of each measurement for all Trial Projections are stored in the storage of magnitudes of distortion components of Trial Projections (431). For each Trial Projection the unnormalized magnitudes of the distortion components in distance, area, and shape, (and mixed area-shape if desired) are stored. Finally, these unnormalized magnitudes are being normalized by multiplying each distortion component by the corresponding normalization weight previously determined by the distortion components normalization module (42). This produces the final measurement of the distortions in each Trial Projection: the normalized magnitudes of distortion components in distance, area, and shape (and mixed area-shape if desired), which form the so called distortion spectrum for each Trial Projection. The distortion spectrum contains all the essential information on the cartographic distortions in Trial Projections.

The important feature of the distortion spectrum is that all components of distortions are normalized, which means they are all expressed in terms of the Standard Unit of Distortion (SUD). In analyzing the distortion spectrum (of minimum-error projection, or any other Trial Projection, for example), the user can still distinguish between the distortions in distance, area, and shape, shape (and mixed area-shape if desired) but now he/she can inter-compare different types of distortions to get the extra information on the relative composition of distortions in the projection, such as the ratio of the distortion in area to the distortion in shape, and so on.

The utility of the distortion spectrum for cartographic analyses of a given projection can be best explained through the example. Suppose user chose Robinson's projection to serve as a reference projection. To normalize distortion measurements in any Trial Projection the distortion components normalization module (42) first evaluates all three distortion components in Robinson projection. In general these measurements result in three widely scattered values of the distortion components, each expressed in its own specific natural unit. Next, the user may postulate that the selected reference projection (Robinson in this case) possesses an even balance of all three components of distortion. This user postulate is fulfilled by the distortion components normalization module through the calculation of the normalization weights in such a way that the normalized values of distortion components for Robinson projection will all adjust to one Standard Unit of Distortion (1 SUD). In other words, the distortion spectrum for this particular reference projection (Robinson's projection) has been normalized to reflect the (presumed) perfect balance of all kinds of distortions in Robinson's projection. Having determined the normalization weights, the distortion components evaluation module (43) is used as a measuring device to evaluate and pre-multiply by the normalization weights the cartographic distortions in any projection of interest, in this case in every Trial Projection, including the resultant minimum-error projection. To continue this example, suppose that for the particular Trial Projection the distortion components evaluation module (43) arrived at the following distortion spectrum: distance distortion component—1 SUD, areal distortion component—2 SUD, and shape distortion component—0.5 SUD. The user can interpret these results as follows: this Trial Projection has four times more distortions in areas than it has distortions in shapes, and it has twice as much distortions in areas than it has distortions in distances. In other wards, this hypothetical Trial Projection has characteristics which are much closer to the conformality property than to the equal-area or equidistant properties. (perfectly conformal projection would have the normalized shape distortion component evaluated to 0 SUD).

Block 44 represents the Distortion function evaluation module. The purpose of this module is to construct a single-valued distortion measurement, for use by the optimization algorithm applied to Trial Projection by the Distortion Function Minimization Module (46). This single-valued measure is defined by the so called Distortion Function, which was established by the user when working with the design criteria module (41). The Distortion Function can be derived from the distortion spectrum—it provides a sort of a summary of distortions which are contained in the Trial Projection, or the conglomerate (cumulative) measure of distortions, or the total distortion score of the Trial Projection. Most often the Distortion Function is defined as the weighted average of the normalized distortion components, or as the weighted Root Mean Square measure of these components (the RMS "power" of the distortion spectrum). The coefficients of the Distortion Function (such as weights used in the weighted average) are being retrieved from the Storage of Distortion Function Coefficients (441), and applied to the previously calculated normalized distortion components of any Trial Projection to produce a singled-valued measure of distortion: the actual value of the Distortion Function for each Trial Projection. By nature of the optimization algorithm applied by the Distortion Function Minimization Module (46), each consecutive Trial Projection has lower value of the Distortion Function than its predecessor. The calculated values of the Distortion Function are saved in the Storage of Magnitude of Distortion Function (442) for all Trial Projections for future reference.

Extending the previous example of the Distortion Function, by defining the Distortion Function to be a simple sum of the three distortion components in the distortion spectrum, the total distortion score of the Trial Projection from this example would be 1+2+0.5=3.5 SUD. The user may compare this result with any other Trial Projection, including the resultant minimum-error projection, or with the reference projection (by comparison, the cumulative distortion score of Robinson's projection used in previous example as the reference projection would be 3 SUD precisely).

Block 45 represents the Visualization Module for Real-Time Animation. The purpose of this module is to allow the user to visualize the progress of the distortion minimization process applied by the Distortion Function Minimization Module (46) to the Trial Projection. This module allows the user to monitor the "evolution history" (in form of visualizations and the associated ASCII reports) of the development of the graticule, continental shoreline, contour map of distortion in areas, and many other geometric distortion characteristics of Trial Projections, as they develop from the Initial Projection, through all the intermediate Trial Projections, until the final minimum-error projection is reached. Various visualizations of interest can be monitored in isolation (such as the graticule), or two or more types of visualizations can be monitored together superimposed on one another (such as the graticule with the continental shoreline). Real-time property of the resultant computer animation means that the screen displays are concurrent with the progress of the minimization of distortions in Trial Projections (conducted by the distortion minimization means), which has an effect of creating a computer animation movie (452) by flashing a succession of images on the screen, each one a little different from the previous one. For example, when the evolution history of graticule is monitored, the user will see the shape of the graticule slowly changing from the initial configuration implied by the Initial Projection, through all the intermediate shapes produced by the sequence of Trial Projections, until the final shape of the minimum-error projection is reached. This real-time animation may seem smooth or jerky, depending on the performance of minimization process for the given set of design criteria, as well as on the floating-point calculation speed in relation to the graphic display speed of the particular computer system. The user has the ability to temporarily freeze a particular display, to take a closer look. The user can also abort the distortion minimization process at any time. This is useful when the sequence of Trial Projections which is being monitored through the real-time animation means develops undesired characteristics. The user can interactively control the contents of visualizations (graticule superimposed on continental shoreline, graticule only, ... ), and the graphic characteristics of display (such as color). Also, during the real-time animation the user can zoom in on the specific area of interest on the map, for example on the polar region, or the user may devote an additional separate window which is constantly focussed on the polar region. All this current controlling information and user preferences are stored in the storage means of real-time animation directives (451).

Block 46 represents the Distortion Function Minimization Module. This module controls the process of minimization of distortions, and decides if the distortions have been minimized sufficiently to terminate the minimization process and name the current Trial Projection the sought for minimum-error projection. The standard optimization algorithm from a textbook on numerical methods can be applied to minimize the value of distortion function. For example, "downhill simplex method" due to Nelder and Mead, as described in chapter 10.4 of (Press et al., 1992), gives good results. The flow of work of the Distortion Function Minimization Module and the underlying optimization algorithm will be now described. The distortion minimization process begins with the Initial Projection as the first Trial Projection. The initial value of the distortion function is evaluated for this initial Trial Projection by the Distortion function evaluation module (44) in communication with the distortion components evaluation module (43). Next, the Distortion Function Minimization Module modifies at least one of the parameters of the Trial Projection (stored in the Parameter Storage Means for all Trial Projections, 461), to establish the new Trial Projection which has less cartographic distortions (as measured by the magnitude of the distortion function determined by the Distortion function evaluation module, 44). The new set of parameters defines the new Trial Projection and is saved in the Parameter Storage Means for all Trial Projections(461), together with the previous set of parameters. The minimization process then proceeds iteratively: the Distortion Function Minimization Module modifies at least one of the parameters of the latest (current) Trial Projection (stored in the Parameter Storage Means for all Trial Projections (461), to establish the new Trial Projection which has less cartographic distortions (as measured by the magnitude of the distortion function determined by the Distortion function evaluation module, 44). This new set of the parameters defines the new Trial Projection and is saved in the Parameter Storage Means for all Trial Projections (461), together with all the previous sets of parameters. On FIG. 4, the closed loop originating and ending at the Distortion Function Minimization Module(46) symbolizes the iterative nature of this distortion minimization process. The iterative process terminates when, for some current Trial Projection, the parameters cannot be modified in a way to produce the lower value of the distortion function. In such case this last Trial Projection becomes the desired minimum-error projection. The final set of parameters defining the minimum-error projection is also written to the Parameter Storage for Minimum-Error Projection (462) for future reference and analyses.

In the course of the iterative process of minimization of distortions the Visualization Module (45) is employed to generate and display on screen the chosen visualization of selected type of distortions contained in the current Trial Projection (such as the shape of the graticule). When the next set of parameters of the Trial Projection is generated by the Distortion Function Minimization Module and becomes available in the Parameter Storage for all Trial Projection (461), the Visualization Module (45) re-generates the chosen visualization using the new set of parameters of the current Trial Projection and re-displays visualization in place of the old one. Such a repetitive act of re-displaying of visualization is called the real-time animation, which was described under Visualization Module for Real-time Animation (45).

Block 47 represents the analyzer module. The purpose of this module is to allow the user to analyze the results of distortion measurements in the resultant minimum-error projection, any Trial Projection (including the Initial Projection), and the reference projection. The main form of these analyses is through creation of interactive visualizations of distortions and ASCII distortion statistics. Visualizations are displayed on the computer screen so that the user can interact with them during the interactive analysis of results. The important feature of the system for finding new minimum-error projection is that the analyzer module (47) can work concurrently with the minimization of distortion process conducted by the Distortion Function Minimization Module (46) and the real-time animation process generated by the Visualization Module for real-time Animation (45). For example, the user may initiate the minimization process for the chosen Initial Projection, together with the associated real-time animation of the evolution of graticule. The user may then start the Analyzer Module (47) to analyze the distortions in the Initial Projection (or reference projection, or even in the minimum-error projection constructed in the past and saved for future reference). During the analyses the Distortion Function Minimization Module (46) keeps working in the background, and the Visualization Module for real-time Animation (45) keeps generating the associated real-time animation, so that the user can monitor the minimization development on the background screen while working with the analyzer module (47) on the main screen. The analyzer module (47) performs interactive analyses of the minimum-error projection, any Trial Projection (including the Initial Projection), and the reference projection, or in fact any projection for which the parameters are available. The particular projection selected for analysis will be called here the subject projection. Interactive analysis means that the on-screen visualizations which are generated by the analyzer module (47) respond to user's formatting commands in real time. For example, the magnification (height scale) of the distortion bars representing the distortion spectrum can be adjusted by the user in real time (the distortion bars and other visualizations of the distortion spectrum will be described in detail later). In addition to the on-screen interactive visualizations, the user may write the results to a file for future reference, or obtain the hard-copy output.

The information created by the analyzer module can be divided into graphical type and ASCII type. The interactive visualization module (471) is a sub-module responsible for displaying the graphic type distortion information. The interactive ASCII reporting module(472) is a sub-module responsible for the display of the related ASCII type distortion information.

With the aid of interactive visualization module (471) the user may compose many types of visualizations of distortions (collectively represented by the output block 4712) contained in the subject projection. Each visualization can be constructed and analyzed separately, or two or more different visualizations can be constructed and studied together (superimposed on each other). The output is in the form of on-screen visualizations which react in real time to user directives. All these directives or customization parameters (graphical properties and other attributes) are being stored in the Storage of interactive visualization directives (4711). These parameters reflect user preferences for viewing distortions and are retained from one computer session to the next. Another important function of interactive visualization module is to provide the plot preview capability: if user likes the form of the graphics, he or she may write it to a file (exactly as seen on the computer screen, known as "what you see is what you get" feature) for future reference, or send it to the plotter to obtain the hard-copy output. The most important examples of distortion visualizations available from the interactive visualization module (471) are a) The Distance Distortion Field (FIG. 5).

The distance distortion field for a projection analyzed in accordance with a preferred embodiment of the invention, as described under design criteria module (block 41), can be visualized by plotting each distance as the straight line segment on the subject projection. The user can view not only the spatial locations of distances used in the calculation of the distance distortion component but also the amount of distortion in each individual distance can be signified by the appropriate color (red for expansions, blue for contractions, gray for no change, for example), or by line thickness (thin for expansions, thick for contractions, normal for no change, for example). This provides a new and important type of distortion display and analytical tool not used in cartography prior to the present invention. The color schema for the magnitude of distortion and other attributes of the distance distortion field can be user-controllable in real time. The appropriate legend associated with the distance distortion field explaining the color schema can be automatically generated.

Other related interactive analyses of distance distortion field can be performed by the user, some examples are: directional analysis—displays only the distances oriented geographically within the specified range of azimuths, magnitude analyses—displays only the distances with distortions within the specified range of values, territorial analyses—displays only the distances contained within the specified region, direction-magnitude analysis—determines the prevailing direction of maximum distortion, and so on. For each type of analysis the associated distortion statistics can be generated and displayed, such as the value and the location of the most distorted distance, least distorted distance, the displays (and values) of the most and the least distorted directions, the most and the least distorted sub-regions, and other types of statistics. (Even more statistical and tabular data related to the distance distortion field is available from the interactive ASCII reporting module (472), to be described in the next section).

b) Sonification of the Distance Distortion Field.

Another method of analysis associated with the distance distortion field will be called here the Sonification of the distance distortion field. In this new multi-media technique the user may request that an audio signal be generated by some or all of the distances in distance distortion field. The pitch of the signal is in proportion to the amount of distortion contained in a given distance: higher tones for extensions and lower tones for contractions, for example. The user is under impression that the distances in the distance distortion field behave like vibrating strings of a musical instrument, such as violin. The physical tension on each string, which determines its pitch, is proportional to the amount of distortion contained in the corresponding distance. The user can excite all of the strings in the distance distortion field at once, or only the selected few, or only the strings in the selected sub-region, or the selected direction, and so on.

c) Stethoscope examination of the distance distortion field.

A specific interactive type of distortion analysis based on sonification will be called the "stethoscope examination" of the distance distortion field. In this technique, which is unique for the present invention, the user moves a graphic icon on the screen called the stethoscope (which is a circular graphic representation of the doctor's stethoscope) superimposed over the distance distortion field, and listens to sounds produced only by the distances in the immediate vicinity of the stethoscope.

d) Two graphic representations of the distortion spectrum (FIG. 7A and FIG. 7B).

The construction of the distortion spectrum of the subject projection was described under the distortion components evaluation module (block 42) and the preceding modules. In the previous sections of this document the meaning of the distortion spectrum was strictly numerical, consisting of a set of three (or four) numbers which measure the amount of cartographic distortions of the three (or four) basic types contained in the projection: distortions in distance, area, and shape (and mixed area-shape if desired). These numbers are called the distortion components. The distortion components form the (numerical) distortion spectrum of subject projection after they have been normalized against the reference projection (normalization procedure is explained under distortion components normalization module (42), and under distortion components evaluation module (43)).

To facilitate the quick and easy visual "readout" of the distortion components in the distortion spectrum, the numerical distortion spectrum can be visualized in two distinct forms. The first form is the bar chart, called here the (graphical) distortion spectrum, or the "distortion bars", as shown on FIG. 7A. The second form is the pie chart, called here the "distortion dial", as shown on FIG. 7B.

Both graphic representations have their own merits. Every subject projection analyzed in accordance with a preferred embodiment of the invention has its own distortion pattern, especially well visible in the (graphical) distortion spectrum FIG. 7A. The distortion dial FIG. 7B shows the relative composition of distortions in the subject projection more effectively. The size of the dial can automatically change in proportion to the sum total of all three components in the distortion spectrum (total distortion score of subject projection defined by the Distortion Function) which, when compared with the size of the distortion dial of the reference projection or with one or more other projections, indicates in a glance the overall quality of the projection under analysis. The geometric proportions, the patterns, color schema, and other graphic attributes of the distortion spectrum and the distortion dial can be user-controllable in real time.

e) The color-filled contour map of distortions in areas (FIG. 8).

The spatial distribution of the distortion in area is visualized by constructing the color-filled contour map of distortions in areas on the subject projection. The contours or isograms on this map are defined as the lines of constant value of the areal distortion indicator, such as the one given by equation (3) (which was chosen by the user for the calculation of the area distortion component, as described under design criteria module). A standard contouring algorithm described in the literature on Digital Terrain Models is employed in the construction of this visualization. The legend describing the contour intervals, and the color schema can be automatically generated by the analyzer module. The contour intervals, color schema, and other graphic attributes of the contour map of distortions in areas and its legend can be user-controllable in real time.

f) The color-filled contour map of distortions in shapes (FIG. 9)

The spatial distribution of the distortion in shape is visualized by constructing the color-filled contour map of distortions in shapes on the subject projection. The contours or isograms on this map are defined as the lines of constant value of the shape distortion indicator, such as the one given by equation (4) (chosen by the user for the calculation of the shape distortion component, as described under design criteria module). A standard contouring algorithm in the literature on Digital Terrain Models is employed. The legend describing the contour intervals, and the color schema can be automatically generated by the analyzer module. The contour intervals, color schema, and other graphic attributes of the contour map of distortions in shape and its legend can be user-controllable in real time.

g) The contour map of mixed area-shape distortions.

The spatial distribution of the mixed area-shape distortion is visualized by constructing the contour map of mixed area-shape distortions on the subject projection. The contours or isograms on this map are defined as the lines of constant value of the mixed area-shape distortion indicator, such as the one given by equation (9) (chosen by the user for the calculation of the mixed area-shape distortion component, as described under design criteria module). A standard contouring algorithm in the literature on Digital Terrain Models is employed. The legend describing the contour intervals, and the color schema can be automatically generated by the analyzer module. The contour intervals, color schema, and other graphic attributes of the contour map of mixed area-shape distortions and its legend can be user-controllable in real time. (The illustration of this contour map is similar to the two previous distortion visualizations, so it is not included here).

h) Map of ellipses of distortions, known as Tissot's Indicatrices (FIG. 10).

Different but equally important visualization of the mixed area-shape distortions is created by plotting the ellipses of distortions, known in cartography as Tissot's Indicatrices, on the subject projection. Indicatrices are plotted at the user specified intervals. They can appear all in one color, or the color may vary depending on some other distortion characteristics chosen by the user. For example, the color of the Indicatrix may indicate the value of the areal distortion indicator at the center of that Indicatrix. The associated analyses that can be performed on Indicatrices are: sorting Indicatrices by size, by orientation, by flatness, and so on. The legend describing the color schema can be automatically generated by the analyzer module. The legend, and other graphic attributes of Indicatrices (such as relative sizes) can be user-controllable in real time.

i) Floating indicatrix.

The "floating indicatrix" visualization and analysis technique is highly interactive version of distortion analysis based on Tissot's Indicatrices. In this technique the user can drag (with a mouse or by using arrow keys from the keyboard) a single graphic representation of the Indicatrix superimposed on the graticule (or any other type of display) on the subject projection. As its location changes, the Indicatrix changes its size, shape, and color in real time to reflect the local behavior of distortions.

j) The contour map of distortions along parallels of latitude.

An important type of distortion analyses is accomplished by constructing the contour map of distortions along parallels of latitude, known in cartography as the scale factor k on the subject projection. The definition of scale factors can be found in Snyder (1987), chapter 4. The contours or isograms on this map are defined as the lines of constant value of the scale factor k. A standard contouring algorithm is employed. The legend describing the contour intervals, and the color schema can be automatically generated by the analyzer module. The contour intervals, color schema, and other graphic attributes of the contour map of k-variation and its legend can be user-controllable in real time.

k) The contour map of distortions along the meridians.

An important type of distortion analyses is accomplished by constructing the contour map of distortions along the meridians, known in cartography as the scale factor h on the subject projection. The definition of scale factors can be found in Snyder (1987), chapter 4. The contours, or isograms, on this map are defined as the lines of constant value of the scale factor h. A standard contouring algorithm is employed. The legend describing the contour intervals, and the color schema can be automatically generated by the analyzer module. The contour intervals, color schema, and other graphic attributes of the contour map of h-variation and its legend can be user-controllable in real time.

l) Single contour threading.

One important variation of the distortion analyses which are based on the contour mapping of any distortion field is a technique which may be called the "single contour threading". In this type of interactive visualization the user specifies the single value of the contour and the system creates and displays a single contour or isogram corresponding to the selected value. The user can adjust the value using the slider-like graphic gadget on the screen and observe the corresponding contour being recreated in real time. A little arrow is attached to the contour showing the direction in which distortions increase.

m) The graticule (FIG. 11).

The graticule is the set of lines of constant longitude and latitude values drawn on the subject projection. The line spacing and other graphic attributes can be user-controllable in real time.

n) Continental shoreline (FIG. 12).

Continental shoreline can be displayed on the subject projection, which may be generated from the geographic database, such as the Digital Chart of the World (DCW). The types of features included (like rivers, borders, . . . ), their attributes, and the level of generalization (which depends upon the desired map scale) can be user-controllable in real time.

The analyzer module (47) can also create an ASCII type of information about the distortions in the subject projection (in form of numerical tables and graphs). interactive ASCII reporting module(472) is a sub-module responsible for generation of the ASCII type distortion reports. The user may compose many types of ASCII reports of distortions (collectively represented by block 4722) contained in the subject projection with the aid of interactive ASCII reporting module. The output is in the form of on-screen displays which react in real time to user directives. All these directives or customization parameters (attributes of tables and graphs) of the ASCII type distortion information are being stored in the Storage of interactive ASCII report directives (4721). These parameters reflect user preferences for reporting distortions in ASCII form and are retained from one computer session to the next. Another important function of the interactive ASCII reporting module is to provide the print preview capability: if user likes the form of the report, he or she may write it to a file for future reference, or send it to the printer to obtain the hard-copy output.

Only most important examples of ASCII reports available from the interactive ASCII reporting module (472) are mentioned here (in general every type of visualization available from the interactive visualization module 471 can have its associated ASCII type report):

a) Numerical distortion spectrum.

These are the numerical values of basic distortion components in the subject projection (described under the distortion components evaluation module 43).

b) Numerical values of the alternative expressions of distortion components.

For each distortion component an alternative formula for the distortion measure can be (optionally) selected by the user with the help of design criteria module (in addition to the main formula chosen). These alternative formulas are evaluated and normalized by distortion components evaluation module 43 in parallel to the main formulas. These alternative values are important in comparative analyses of the effectiveness of various mathematical expressions for describing distortions.

c) The distortion function (or conglomerate distortion measure).

This is the value of the distortion function for the subject projection (see the description of the Distortion function evaluation module 44). This conglomerate measure plays the role of the total distortion score of a projection, and is an indicator of the distortion performance of projection analyzed, which can be compared with other projections (when, for example, selecting the best projection for a given purpose). (The distortion function is also used by the design criteria module (41) as an important tool to control the relative composition of distortion in the resultant minimum-error projection).

d) Normalization weights.

These are the weighting factors used in normalization of the distortion components (see the description of the distortion components normalization module 42)

e) Statistics describing the Distance Distortion Field.

These are numerical statistical data, such as a number N of distances used to construct the distance distortion field, data about probability distribution of distances, minimum and maximum size of distance used, the location and values of distances with the extremum (minimum and maximum) distortions, and more (see the description of the design criteria module 41).

f) Statistics describing areal, shape, mixed area-shape distortions.

These can include the number N of sample points used to construct the given distortion field, the location and values of the extremum (minimum and maximum) distortions, and other characterizations suitable for ASCII format.

Block 48 represents the Off-line analysis generator module. The purpose of this module is to automatically create visualizations of distortions and ASCII distortion reports for the minimum-error projection, any Trial Projection (including the Initial Projection), and the reference projection, or in fact any projection for which the parameters are available. The particular projection selected for analysis will be called here the subject projection. The off-line analyzes of the subject projection are based on the default set of directives supplied by the system. Similarly to the data structures associated with the analyzer module (47), the default set of directives for the Off-line analysis generator module (48) describe formats and attributes of visualizations and ASCII distortion reports to be automatically created for the user. The graphic visualizations and ASCII reports are written, respectively, by submodule 481 to the graphic file and by submodule 482 to the ASCII file (see output blocks 4812 and 4822) for future reference by the user. The generation of visualizations and statistics occurs off-line, which means that the user does not interact with this process (once started) and does not see any related effects except the notification of the completion. The Off-line analysis generator module works "in the background", which means that (after the user starts The Off-line Analyzes Generator process) the user may work independently with any other module in the system such as the design criteria module (41) or the analyzer module (47).

The default set of directives controlling the attributes of visualizations and ASCII reports is provided by the system in the Storage of automatic visualization directives (4811) and in the Storage of automatic ASCII report directives (4821). The content of this storage is independent from the contents of the Storage of interactive visualization directives (4711) and the Storage of interactive ASCII report directives (4721) as described for the analyzer module (47). The user may adjust the contents of this storage and customize the directives to his/her needs at any time. In particular, the user may select which visualizations and reports to generate. Also, the user may make all or parts of the automatic directives storage used by the Off-line analysis generator module (48) to coincide with the interactive directives storage used by the analyzer module (47). Another important feature of the Off-line analysis generator module (48) is its ability to "wait" for the completion of the distortion minimization process for the current minimum-error projection design. Suppose that the user initiated the distortion minimization process for the current set of design criteria. The user also requested the Off-line Analyzes of the resultant minimum-error projection. At this point the user may go home, and the Off-line analysis generator module (48) will wait until the Distortion Function Minimization Module (46) completes the determination of the minimum-error projection. As soon as the parameters of the newly created minimum-error projection become available on the Parameter Storage for Minimum-Error Projection (462), the Off-line analysis generator module (48) will automatically generate all the requested analyses.

Block 49 represents the Animation Module. The main purpose of this module is to generate the computer animation movie showing the development history of selected aspect of cartographic distortions which is associated with the iterative process of construction of the minimum-error projection, as it develops from the Initial Projection, through all the intermediate Trial Projections, until the final minimum-error projection is reached. The main difference between the Animation Module (49) and the Visualization Module for Real-time Animation (45) is that the Animation Module generates animations from the collection of pre-constructed visualization images (called frames) saved in the Storage of Animation Frames (4912), whereas the Visualization Module for Real-time Animation creates real-time animation by constructing each visualization image directly before it is being displayed on the screen. That means that the animations generated by the Animation Module (49) can be replayed much faster (at least 30 frames per second) than the real-time animations generated by the Visualization Module for Real-time Animation. Another difference is that the animations created by the Animation Module (49) can be replayed as many times as needed, whereas the real-time animation can be viewed only once during the action of the distortion minimization process described under the Distortion Function Minimization Module (46).

Figure 13:
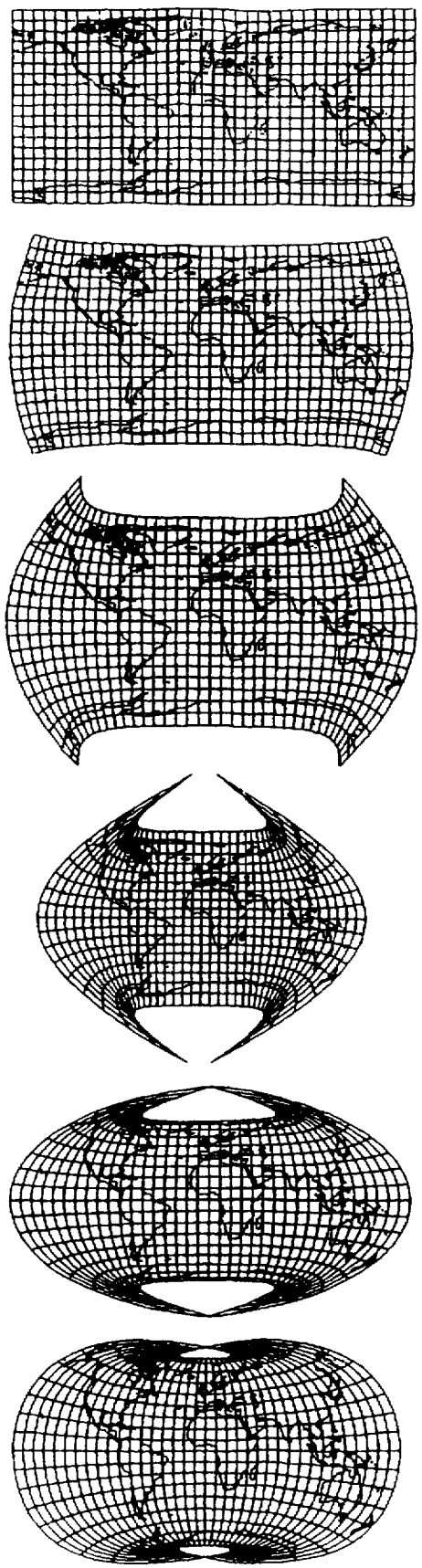
FIG. 13 shows a sample of six non-consecutive frames taken out of a typical animation sequence containing typically close to 1000 frames, where the top frame on the figure corresponds to the initial projection and the bottom frame corresponds to the resultant minimum-error projection constructed in accordance with a preferred embodiment of the invention.

The Animation Recorder (with Preview) Module (491) prepares the frames for the animation. Multiple animations can be simultaneously requested by the user as the separate animation movies (for example, one movie with the graticule, another movie with the continental shoreline), or different types of visualizations can be superimposed on one movie (for example, one movie showing the graticule superimposed on the continental shoreline). The user directives which specify what kind of animation movies are desired and describing user preferences for graphic attributes (such as color) of the individual types of visualizations involved, are stored in the Storage of Animation Directives (4911). To construct the animation frames, the Animation Recorder (with Preview) Module (491) reads all the parameters of all the Trial Projections stored in the Parameter Storage for all Trial Projection (461). If the distortion minimization process is still pending for the current design, and not all Trial Projections in the sequence are available, the Animation Recorder can "wait" until all needed Trial Projection parameters become available (it can however immediately start working on the "early" frames for which the Trial Projection parameters do exist on the Parameter Storage for all Trial Projection, 461). For each set of parameters of Trial Projection the Animation Recorder constructs the needed visualization images as indicated by the Storage of Animation Directives (4911). These graphic images become frames and are being stored in the Storage of Animation Frames (4912). If only one movie is requested, one frame per Trial Projection will be created and stored. If two or more movies are requested, two or more frames per Trial Projection will be created and stored. When all frames for all Trial Projections are constructed and saved in the Storage of Animation Frames (4912), the process of "recording" the animation by the Animation Recorder (491) is complete. FIG. 13 shows 6 (non-consecutive) frames taken out of a typical animation containing typically close to 1000 frames. The top frame on FIG. 13 corresponds to the initial projection (this is the first trial projection). The bottom frame on FIG. 13 corresponds to the resultant minimum-error projection (this last frame is also the last trial projection constructed by the Distortion Function Minimization Module 46). In the actual animation sequence there would be at least 100 frames between each neighboring frames shown in FIG. 13, producing a very smooth transition and resulting in smooth animation. Although only 6 sample frames are shown on FIG. 13, it suggests the typical evolution history of graticule with the continental shoreline on the typical animation movie.

A special feature of the Animation Recorder Module (491) is the preview option (4913). With this option activated, the user can see each visualization image on the screen as it is being constructed by the Animation Recorder. The user can also freeze one particular image for more careful inspection (without a halt to a frames building process). Based on this inspection the user can adjust some or all graphic preferences in the Storage of Animation Directives (4911), and can request that the Animation Recorder Module (491) start building frames from the beginning, using the new set of directives in the Storage of Animation Directives (4911). The user may also abandon the animation building process altogether at any time. Another feature available in the preview animation option for the Animation Recorder Module (491) is the ability to actually re-play the already existing frames (but possibly yet incomplete set) as the animation movie at the regular speed. This is useful in determining how smooth the animation is, and if more intermediate frames are needed to improve the smoothness. If necessary, the Animation Recorder module can generate the needed intermediate frames by using the linear interpolation method between the already constructed adjacent frames. The Animation Player Module, block 492, allows for the replay of animation movies (4922) prepared by the Animation Recorder (491). The movies are played on the computer screen at a rate of 30 frames per second to achieve the desired apparent smoothness. The features which are typical for today's Video Player operation are available for the Animation Player Module, such as rewind, fast forward, slow motion, freeze, frame-by-frame, and other. The current settings controlling the way the movie is played on the Animation Player (492) are stored in the Storage Means of the Player's Control Parameters (4921).

The user can also record a movie on a standard VCR tape, by using the typical multi-media software/hardware package available on a given computer system.

REFERENCES

Airy G. B. (1861) Explanation of a projection by balance of errors for maps applying to a very large extent of the Earth's surface; and comparison of this projection with other projections. London, Edinburgh, and Dublin *Philosophical Magazine*, series 4, v. 22, no. 149, pp.409–421 Biernacki F. (1965) Theory of representation of surfaces for surveyors and cartographers, published for the U.S. Department of Commerce and the National Science Foundation, Washington, D.C., by the Scientific Publications Foreign Cooperation Center of the Technical and Economic Information, Warsaw, Poland Bomford G. (1980) Geodesy, Forth edition, Clarendon Press, Oxford Canters Frank (1989) New projections for world maps/a quantitative-perceptive approach, *Cartographica* Vol. 26, No 2, pp. 53–71

Canters F., Decleir H. (1989) The world in perspective, a directory of world map projections, John Wiley & Sns, Chichester, N.Y.

Laskowski P. (1989) The traditional and modern look at Tissot's Indicatrix, *The American Cartographer*, vol. 16, No. 2, pp. 123–133

Meshcheryakov G. A. (1965) The problem of choosing the most advantageous projections, *Geodesy and Aerophotography* No. 4, pp. 263–269

Press W. H., B. P. Flannery, S. A. Teukolsky, W. T. Vetterling (1992) Numerical recipes in C, The art of scientific computing, Second edition, Cambridge University Press, Cambridge Snyder, John P. (1987) Map projections- a working manual, U.S. Geological Survey professional paper 1395, U.S. Government Printing Office, Washington Snyder, John P. (1985) Computer-assisted map projection research, U.S. Geological Survey Bulletin 1629, U.S. Government Printing Office.

Tissot N. A. (1881) Memoire sur la representation des surfaces at les projections des cartes geographiques, Gauthier Villars, Paris Vanicek P., Krakiwsky E. (1986) Geodesy the concepts, second edition, Elsevier Science Publishers, North-Holland

What is claimed is:

1. A system, for deriving a cartographic projection having a minimum distortion with respect to selected components of distortion, comprising:
   (a) parameter storage means for storing current values of parameters of a first function, having modifiable parameters describing a subject projection, the subject projection being for mapping earth coordinates into two-dimensional coordinates on the surface of a map;
   (b) distortion calculation means for determining the numerical values of distortion of the subject projection with respect to selected components of distortion;
   (c) weight storage means for storing weight established for each of the selected components of distortion of reference projections to be indicative of the relative levels of such components in the reference projection;
   (d) normalizing means, in communication with the distortion calculation means, for normalizing the numerical values of the selected components of distortion determined by the distortion calculation means, using weights in the weight storage means;
   (e) modifying means, for modifying at least one of the current parameters stored in the parameter storage means, in such a way as to reduce at least one selected component of distortion attributable to the subject projection determined by the distortion calculation means, so as to establish a new subject projection;
   (f) performance function means, in communication with the normalization means, for determining a desired second function of the normalized values of the selected distortion components that is indicative of the distortion performance of the subject projection;
   (g) evaluation means, for determining whether the value of the desired second function has been minimized to a desired extent; and
   (h) output means for providing a map based on the current parameters of the subject projection.

2. A system according to claim 1, further comprising means for loading initial values into the parameter storage means; and
   weight calculation means, in communication with the distortion calculation means, for calculating and loading into the weight storage means a set of weights based on the initial values of parameters in the parameter storage means, so that the reference projection is the subject projection described by the initial values of such parameters.

3. A system according to claim 2, wherein the selected components of distortion are with respect to distance, angle and area.

4. A system according to claim 2, wherein the desired second function is a weighted sum of the normalized values of the selected distortion components.

5. A system, according to claim 2, wherein the first function is polynomial and the parameters are coefficients.

6. A system according to claim 5, wherein the desired second function is a weighted sum of the normalized values of the selected distortion components.

7. A system according to claim 6, wherein the selected components of distortion are with respect to distance, angle and area.

8. A system, for evaluating quantitatively the degree of distortion of a subject cartographic projection in relation to a reference projection, comprising:
   (a) parameter storage means for storing current values of parameters of a function describing the subject projection;
   (b) distortion calculation means for determining the numerical values of distortion of the subject projection with respect to selected components of distortion;
   (c) weight storage means for storing weights established for each of the selected components of distortion of the reference projection to be indicative of the relative levels of such components in the reference projection; and
   (d) normalizing means, in communication with the distortion calculation means, for normalizing the numerical values of the selected components of distortion determined by the distortion calculation means, using the weights in the weight storage means, so as to create a quantitative measure of the degree of distortion of the subject cartographic projection in relation to the reference projection.

9. A system according to claim 8, wherein the function is a polynomial and the parameters are coefficients.

10. A system according to claim 8, wherein the selected components of distortion are with respect to distance, angle and area.

11. A system according to claim 10, wherein the function is a polynomial and the parameters are coefficients.

12. A digital storage medium encoded with computer-readable instructions that, when loaded into a computer, cause the establishment of a system, for deriving a cartographic projection having a minimum distortion with respect to selected components of distortion, having:
   (a) parameter storage means for storing current values of parameters of a first function, having modifiable parameters describing a subject projection, the subject projection being for mapping earth coordinates into two-dimensional coordinates on the surface of a map;
   (b) distortion calculation means for determining the numerical values of distortion of the subject projection with respect to selected components of distortion;
   (c) weight storage means for storing weight established for each of the selected components of distortion of reference projections to be indicative of the relative levels of such components in the reference projection;
   (d) normalizing means, in communication with the distortion calculation means, for normalizing the numerical values of the selected components of distortion determined by the distortion calculation means, using weights in the weight storage means;
   (e) modifying means, for modifying at least one of the current parameters stored in the parameter storage means, in such a way as to reduce at least one selected component of distortion attributable to the subject projection determined by the distortion calculation means, so as to establish a new subject projection;
   (f) performance function means, in communication with the normalization means, for determining a desired second function of the normalized values of the selected distortion components that is indicative of the distortion performance of the subject projection;
   (g) evaluation means, for determining whether the value of the desired second function has been minimized to a desired extent; and
   (h) output means for providing a map based on the current parameters of the subject projection.

13. A medium according to claim 12, wherein the system further comprises means for loading initial values into the parameter storage means; and
   weight calculation means, in communication with the distortion calculation means, for calculating and loading into the weight storage means a set of weights based on the initial values of parameters in the parameter storage means, so that the reference projection is the subject projection described by the initial values of such parameters.

14. A medium according to claim 13, wherein the selected components of distortion are with respect to distance, angle and area.

15. A medium according to claim 13, wherein the desired second function is a weighted sum of the normalized values of the selected distortion components.

16. A medium according to claim 13, wherein the first function is polynomial and the parameters are coefficients.

17. A medium according to claim 16, wherein the desired second function is a weighted sum of the normalized values of the selected distortion components.

18. A medium according to claim 17, wherein the selected components of distortion are with respect to distance, angle and area.

19. A digital storage medium encoded with computer-readable instructions that, when loaded into a computer, cause the establishment of system, for evaluating quantitatively the degree of distortion of a subject cartographic projection in relation to a reference projection, having:

(a) parameter storage means for storing current values of parameters of a function describing the subject projection;

(b) distortion calculation means for determining the numerical values of distortion of the subject projection with respect to selected components of distortion;

(c) weight storage means for storing weights established for each of the selected components of distortion of the reference projection to be indicative of the relative levels of such components in the reference projection; and (d) normalizing means, in communication with the distortion calculation means, for normalizing the numerical values of the selected components of distortion determined by the distortion calculation means, using the weights in the weight storage means, so as to create a quantitative measure of the degree of distortion of the subject cartographic projection in relation to the reference projection.

20. A medium according to claim 19, wherein the function is a polynomial and the parameters are coefficients.

21. A medium according to claim 19, wherein the selected components of distortion are with respect to distance, angle and area.

22. A medium according to claim 21, wherein the function is a polynomial and the parameters are coefficients.

* * * * *